(12) United States Patent
Sasaki

(10) Patent No.: US 10,591,673 B2
(45) Date of Patent: Mar. 17, 2020

(54) OPTICAL FIBER CUTTING SYSTEM

(71) Applicant: FUJIKURA LTD., Tokyo (JP)

(72) Inventor: Katsumi Sasaki, Chiba (JP)

(73) Assignee: Fujikura Ltd., Tokyo (JP)

( * ) Notice: Subject to any disclaimer, the term of this patent is extended or adjusted under 35 U.S.C. 154(b) by 61 days.

(21) Appl. No.: 15/570,156

(22) PCT Filed: Apr. 5, 2017

(86) PCT No.: PCT/JP2017/014243
§ 371 (c)(1),
(2) Date: Oct. 27, 2017

(87) PCT Pub. No.: WO2018/185880
PCT Pub. Date: Oct. 11, 2018

(65) Prior Publication Data
US 2018/0306975 A1 Oct. 25, 2018

(30) Foreign Application Priority Data
Apr. 4, 2017 (JP) .................................. 2017-074180

(51) Int. Cl.
*G02B 6/25* (2006.01)
(52) U.S. Cl.
CPC ..................................... *G02B 6/25* (2013.01)
(58) Field of Classification Search
CPC ........ B26D 1/0425; B26D 1/18; B26D 1/185; B26D 3/06; B26D 3/08; B26D 5/02;
(Continued)

(56) References Cited

U.S. PATENT DOCUMENTS 4,691,987 A * 9/1987 Ebner .................. G02B 6/4249
385/134
5,188,268 A * 2/1993 Hakoun .................... B26D 7/14
225/105
(Continued)

FOREIGN PATENT DOCUMENTS

CN 102360099 A 2/2012
CN 102540339 A 7/2012
(Continued)

OTHER PUBLICATIONS

Office Action in counterpart Korean Patent Application No. 10-2017-7019646 dated Oct. 16, 2018 (6 pages).
(Continued)

*Primary Examiner* — Omar Flores Sanchez
(74) *Attorney, Agent, or Firm* — Osha Liang LLP

(57) ABSTRACT

An optical fiber cutting system includes: a pair of clamps disposed at an interval in a longitudinal direction of an optical fiber and that grips the optical fiber; a disk-shaped blade member including an outer peripheral edge portion, the blade member scratches the optical fiber by moving between the pair of clamps and by bringing the outer peripheral edge portion into contact with a surface of the optical fiber and changes a position of the outer peripheral edge portion where the outer peripheral edge portion is in contact with the optical fiber; a pressing member that cuts the optical fiber by pressing and bending a scratched portion on the optical fiber; and an sensor that acquires position information of the outer peripheral edge portion where the outer peripheral edge portion is in contact with the optical fiber.

11 Claims, 11 Drawing Sheets

(58) Field of Classification Search
CPC ....... B26D 7/2635; B26D 1/225; B26F 3/002; G02B 6/25; G02B 6/255
See application file for complete search history.

(56) References Cited

U.S. PATENT DOCUMENTS

| | | | | |
|---|---|---|---|---|
| 5,253,412 | A * | 10/1993 | Fukuoka | G02B 6/245 15/256.6 |
| 6,634,079 | B1 * | 10/2003 | Kazama | G02B 6/25 29/564.4 |
| 7,090,414 | B2 * | 8/2006 | Chau | G02B 6/25 385/52 |
| 7,828,926 | B1 * | 11/2010 | Gaysinskiy | B26D 7/1827 15/104.002 |
| 8,191,451 | B2 * | 6/2012 | Stolyar | B26D 7/2635 83/499 |
| 8,196,793 | B2 * | 6/2012 | Ohmura | B26F 3/002 225/103 |
| 9,435,954 | B2 * | 9/2016 | Zhao | B26D 5/08 |
| 9,541,710 | B2 * | 1/2017 | Sasaki | G02B 6/3616 |
| 9,726,823 | B2 | 8/2017 | Zhao | |
| 9,885,833 | B2 * | 2/2018 | Vallance | B26D 3/08 |
| 2003/0077062 | A1 | 4/2003 | Sasaki et al. | |
| 2003/0176149 | A1 | 9/2003 | Yoshida et al. | |
| 2006/0201986 | A1 | 9/2006 | Sasaki et al. | |
| 2010/0044406 | A1 * | 2/2010 | Ohmura | B26F 3/002 225/2 |

FOREIGN PATENT DOCUMENTS

| | | |
|---|---|---|
| CN | 206920648 U | 1/2018 |
| JP | H06-186436 A | 7/1994 |
| JP | H08-334627 A | 12/1996 |
| JP | 2850910 B2 | 1/1999 |
| JP | 2005-55479 A | 3/2005 |
| JP | 2006-058474 A | 3/2006 |
| JP | 2006-251034 A | 9/2006 |
| JP | 2006-337165 A | 12/2006 |
| JP | 2009-103813 A | 5/2009 |
| JP | 4383289 B2 | 12/2009 |
| JP | 2012-168260 A | 9/2012 |
| JP | 2015-203786 A | 11/2015 |
| KR | 10-2014-0124717 A | 10/2014 |

OTHER PUBLICATIONS

Office Action in corresponding Japanese Patent Application No. 2017-074180 dated Jun. 20, 2017 (3 pages).

Office Action in counterpart Japanese Patent Application No. 2017-074180 dated Oct. 31, 2017 (3 pages).

* cited by examiner

OPTICAL FIBER CUTTING SYSTEM

TECHNICAL FIELD

The present invention relates to an optical fiber cutting system.

BACKGROUND ART

To cut an optical fiber (a coated optical fiber), bring first a blade member into contact with the optical fiber to produce an initial flaw on the surface of the optical fiber. Then, press a part of the optical fiber where the initial flaw is produced and bend it to cut the optical fiber. The blade member is worn away each time when the initial flaw is produced on the optical fiber. Accordingly, in conventional manners, it is considered to change a part of the blade member where the blade member is in contact with the optical fiber (for example, see Patent Literatures 1 to 3).

Patent Literature 1 discloses that a disk-shaped blade member (a scratching blade) is rotated little by little each time when the blade member produces an initial flaw on an optical fiber.

Patent Literature 2 discloses the following technical matter: an image analyzer analyzes an end surface of an optical fiber after cutting and based on the result of the analysis it is determined whether or not cutting performance deteriorates at a certain part of a blade member; and if determined that the cutting performance deteriorates, automatically change a part where the blade member comes into contact with the optical fiber.

Patent Literature 3 discloses a configuration in which a fusion splicing device, which couples the optical fibers to one another, includes an image analyzer to analyze an end surface of an optical fiber after cutting (before coupling). In this configuration, the image analyzer determines based on the result of the analysis whether or not a certain part of a blade member is worn away, and if determined that the certain part is worn, an instruction to change the part of the blade member where the blade member is in contact with the optical fiber is transmitted to a cutting device including the blade member.

PATENT LITERATURE

Patent Literature 1: Japanese Patent No. 2850910
Patent Literature 2: Japanese Unexamined Patent Application Publication No. 6-186436
Patent Literature 3: Japanese Patent No. 4383289

Since a blade member to cut an optical fiber is expensive, the entire blade member producing an initial flaw to the optical fiber should be completely used without waste. However, with the conventional configurations, the blade member is possibly misplaced when changing the position of the blade member, which causes a part of the blade member to be unused.

SUMMARY

One or more embodiments of the present invention provide an optical fiber cutting system that can use a blade member without waste.

An optical fiber cutting system according to one or more embodiments of the present invention includes: a pair of clamps disposed at an interval in a longitudinal direction of an optical fiber, the pair of clamps being configured to grip the optical fiber; a disk-shaped blade member including an outer peripheral edge portion, the blade member being configured to scratch the optical fiber by moving between the pair of clamps and by bringing the outer peripheral edge portion into contact with a surface of the optical fiber, the blade member being capable of changing a position of the outer peripheral edge portion where the outer peripheral edge portion is in contact with the optical fiber; a pressing member configured to cut the optical fiber by pressing and bending a scratched portion on the optical fiber; and an acquisition unit configured to acquire position information of the outer peripheral edge portion where the outer peripheral edge portion is in contact with the optical fiber, the acquisition unit being a sensor configured to acquire the position information of the outer peripheral edge portion by detecting a direction of a magnetic line corresponding to the position of the outer peripheral edge portion.

Other features of one or more embodiments of the present invention will be apparent from the descriptions below.

According to one or more embodiments of the present invention, acquiring information of the position of an outer peripheral edge portion of a blade member where the blade member is in contact with an optical fiber makes it possible to obtain the position of the outer peripheral edge portion of the blade member with respect to the optical fiber. This makes it possible to use the blade member without waste.

BRIEF DESCRIPTION OF DRAWINGS

FIG. 5A and FIG. 5B are drawings illustrating a relation between the magnetic sensor and a rotation position of a magnet. FIG. 5C is an explanatory diagram of output characteristics of the magnetic sensor.

FIG. 6A is a perspective view according to one or more embodiments describing a rotation unit 50 disposed on a side close to the blade member and a sensor-side unit 60 disposed on a side close to an outer-edge-position measurement sensor 15 on a side close to.

DETAILED DESCRIPTION

Figure 1:
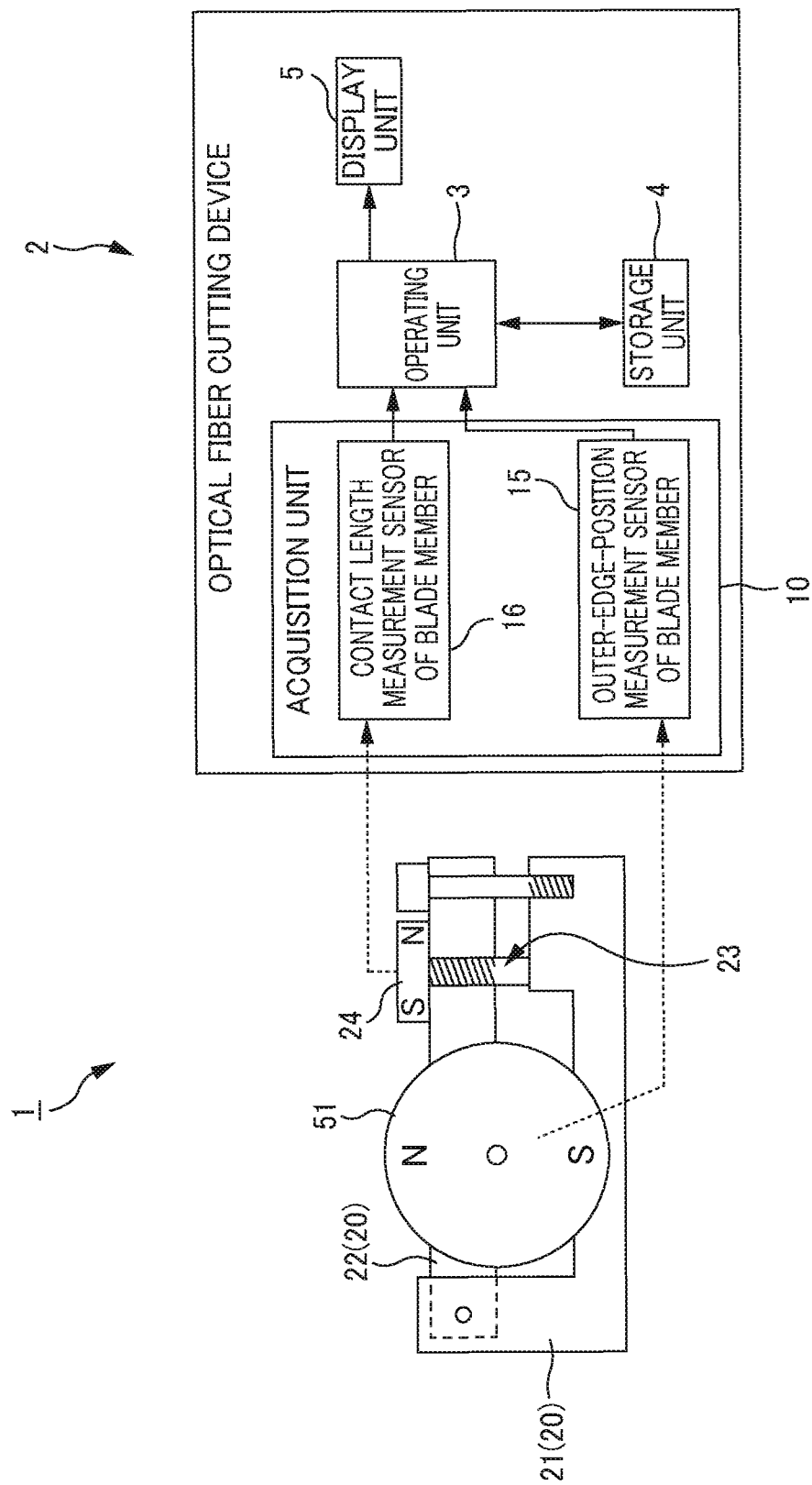
FIG. 1 is a block diagram illustrating an optical fiber cutting system of a first embodiment.

At least the following matters will be apparent from the descriptions below.

The following optical fiber cutting system according to one or more embodiments will be apparent. The optical fiber cutting system includes: of clamps disposed at an interval in a longitudinal direction of an optical fiber, the pair of clamps being configured to grip the optical fiber; a disk-shaped blade member including an outer peripheral edge portion, the blade member being configured to scratch the optical fiber by moving between the pair of clamps and by bringing the outer peripheral edge portion into contact with a surface of the optical fiber, the blade member being capable of changing a position of the outer peripheral edge portion where the outer peripheral edge portion is in contact with the optical fiber; a pressing member configured to cut the optical fiber by pressing and bending a scratched portion on the optical fiber; and an acquisition unit configured to acquire position information of the outer peripheral edge portion where the outer peripheral edge portion is in contact with the optical fiber, the acquisition unit being a sensor configured to acquire the position information of the outer peripheral edge portion by detecting a direction of a magnetic line corresponding to the position of the outer peripheral edge portion. With such optical fiber cutting system, it is possible to obtain accurately the position of the outer peripheral edge portion of the blade member with respect to the optical fiber.

In one or more embodiments, the position information includes a rotation position of the disk-shaped blade member. This makes it possible to acquire accurately the rotation position of the blade member; therefore, it is possible to obtain accurately the position of the outer peripheral edge portion of the blade member with respect to the optical fiber.

In one or more embodiments, the disk-shaped blade member is magnetized so that a magnetic line is along a direction of a diameter of a plane of the disk. And, the acquisition unit is configured to acquire the rotation position of the disk-shaped blade member as the position information by detecting a direction of the magnetic line. This changes the direction of the magnetic line corresponding to the rotation position of the blade member. Therefore, based on the direction of the magnetic line detected by the sensor, it is possible to acquire accurately the rotation position of the blade member.

In one or more embodiments, the blade member is magnetized through an application of a strong magnetic field, and the magnetized blade member itself generates the magnetic line. This makes it possible to simplify the configuration of the components.

In one or more embodiments, the blade member includes a magnet configured to generate the magnetic line. Accordingly, the blade member and the magnet can be separate components.

In one or more embodiments, the magnet is mounted to a fixed component fixed to the blade member. Thus, the direction of the magnetic line generated by the magnet changes according to the rotation position of the blade member. Accordingly, based on the direction of the magnetic line detected by the sensor, it is possible to acquire accurately the rotation position of the blade member.

In one or more embodiments, the position information includes a relative position in a height direction between the blade member and the optical fiber. This makes it possible to accurately acquire the relative position in the height direction between the blade member and the optical fiber. Accordingly, it is possible to accurately acquire the position of the outer peripheral edge portion of the blade member with respect to the optical fiber.

In one or more embodiments, the optical fiber cutting system further comprises an adjustment mechanism, the adjustment mechanism being configured to adjust according to a rotation position of a screw the relative position of the blade member in the height direction. At least one of the screw and a fixed component fixed to the screw is magnetized so that a magnetic line is in a direction perpendicular to a rotation axis of the screw. The acquisition unit acquires as the position information the relative position of the blade member in the height direction by detecting a direction of the magnetic line. Accordingly, the direction of the magnetic line changes according to the rotation position of the screw and/or the fixed component fixed to the screw. Therefore, the relative position in the height direction between the blade member and the optical fiber can be accurately acquired based on the direction of the magnetic line detected by the sensor.

In one or more embodiments, at least one of the screw and the fixed component is magnetized through an application of a strong magnetic field. And, the at least one of the screw and the fixed component itself generates the magnetic line. This makes it possible to simplify the configuration of the components.

In one or more embodiments, a magnet is mounted to at least one of the screw and the fixed component fixed to the screw, and the magnet generates the magnetic line. Accordingly, the screw and the fixed component fixed to the screw can be separate components from the magnet.

In one or more embodiments, the relative position in the height direction between the blade member and the optical fiber is adjusted not by adjusting a position of the blade member in the height direction, but by adjusting of positions of the clamps in the height direction, the clamps being configured to grip the optical fiber. Accordingly, the configuration of the components to move together with the blade member can be compact and simplified.

Figure 2:
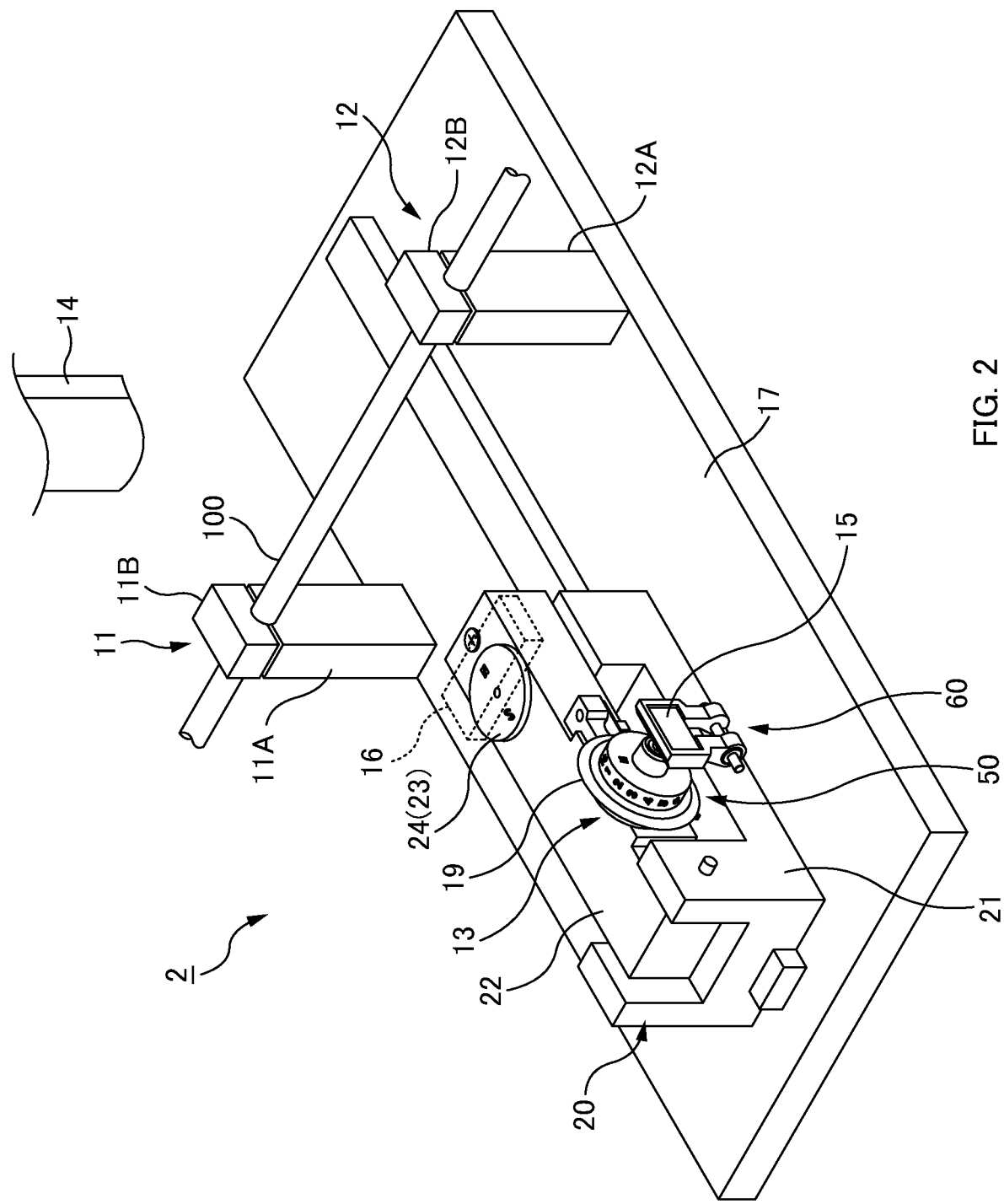
FIG. 2 is a perspective view illustrating a configuration example of the optical fiber cutting system of the first embodiment.

FIG. 1 is a block diagram illustrating an optical fiber cutting system of the first embodiment. FIG. 2 is a perspective view illustrating a configuration example of the optical fiber cutting system of the first embodiment.

An optical fiber cutting system 1 includes an optical fiber cutting device 2 and an acquisition unit 10; the optical fiber cutting device 2 includes a blade member 13 to cut (cleave) an optical fiber 100, and the acquisition unit 10 acquires position information of the blade member 13 with respect to the optical fiber 100. The optical fiber cutting system 1 of this embodiment includes an operating unit 3, a storage unit 4 and a display unit 5, and these units treat the position information of the blade member 13.

The optical fiber cutting device 2 includes a pair of clamps 11 and 12, the blade member 13, and a pressing member 14. The pair of clamps 11 and 12 and the blade member 13 are disposed on a base 17 of the optical fiber cutting device 2. Although not particularly illustrated, the pressing member 14 is also similarly disposed on the base 17.

The pair of clamps 11 and 12 are disposed at an interval in the longitudinal direction of the optical fiber 100, to grip the optical fiber 100. The clamps 11 and 12 each include lower clamps 11A and 12A and upper clamps 11B and 12B, with which the optical fiber 100 is sandwiched in an up-down direction (an up-down direction in FIG. 2). In the lower clamps 11A and 12A and the upper clamps 11B and 12B, elastic pads 18 (see FIG. 3A and FIG. 4A), which are made of a rubber or a similar material, are disposed at sites opposed to one another (sites at which the optical fiber 100 is sandwiched).

The blade member 13 is formed into a disk shape. The blade member 13 is disposed so that a plane of the disk is perpendicular to the longitudinal direction of the optical fiber 100 (a direction in which the pair of clamps 11 and 12 are arranged). The blade member 13 is movable between the pair of clamps 11 and 12 in the direction perpendicular to the longitudinal direction of the optical fiber 100 with respect to the pair of clamps 11 and 12 and the optical fiber 100, which is gripped by the pair of clamps 11 and 12.

In the middle of the path of movement (in the middle of movement) of the blade member 13, an outer peripheral edge portion 19 (a cutting edge) of the blade member 13 comes into contact with the surface of the optical fiber 100 gripped by the pair of clamps 11 and 12, thus scratching the surface of the optical fiber 100.

The blade member 13 is rotatable around an axis of the blade member 13 on a blade base 20. This allows changing a position at which the outer peripheral edge portion 19 of the blade member 13 comes into contact with the optical fiber 100. The blade member 13 is switchable between an unrotatable state and a rotatable state by a ratchet mechanism 54 (described later). This allows appropriately holding the position at which the outer peripheral edge portion 19 of the blade member 13 comes into contact with the optical fiber 100.

Here, there is a height direction (the upward direction in FIG. 2), which is perpendicular to the longitudinal direction of the optical fiber 100 and the moving direction of the blade member 13. With the optical fiber cutting device 2 of this embodiment, a relative position in a height direction between the optical fiber 100 and the outer peripheral edge portion 19 of the blade member 13 is changeable. Accordingly, the pressure (a contact pressure) is changeable at which the outer peripheral edge portion 19 of the blade member 13 is pressed against the surface of the optical fiber 100 at the time when the blade member 13 scratches the surface of the optical fiber 100.

In the optical fiber cutting device 2 exemplified in FIG. 2, the blade member 13 is mounted to the blade base 20 in a rotatable manner around the axis of the blade member 13, and the blade base 20 is disposed movable in the above-described moving direction of the blade member 13 on the base 17. The blade base 20 is a member sliding on the base 17. The base 17 includes a spring (not illustrated). Releasing the compressed spring discharges the blade base 20, thus bringing the blade member 13 into contact with the optical fiber 100 during the movement of the blade base 20.

With the optical fiber cutting device 2 exemplified in FIG. 2, while the position of the blade member 13 in the height direction (the height position) is adjustable, the height position of the optical fiber 100 gripped by the pair of clamps 11 and 12 is fixed. The following specifically describes a mechanism to adjust the height position of the blade member 13.

With the optical fiber cutting device 2 exemplified in FIG. 2, the blade base 20 includes a base portion 21 and an oscillating portion 22, which is joined to the base portion 21 so as to be able to oscillate. A shaft (a joining shaft) that joins the base portion 21 and the oscillating portion 22 together is parallel to the longitudinal direction of the optical fiber 100. The oscillating portion 22 extends away from the joining shaft. The blade member 13 is disposed at a middle part in the direction in which the oscillating portion 22 extends. To a leading end part of the oscillating portion 22 in the direction of the extending, an adjusting screw 23 is mounted which adjusts the height position of the leading end part of the oscillating portion 22 with respect to the base portion 21. This makes it possible to adjust the height position of the blade member 13. A magnet 24 is disposed at a head of the adjusting screw 23 (described later).

With this embodiment, the rotation of the blade member 13 and the height position of the blade member 13 are manually adjusted by an operator who handles the optical fiber cutting device 2.

FIG. 3A to FIG. 3D are drawings describing a process according to one or more embodiments to scratch the surface of the optical fiber 100 with the blade member 13. FIG. 4A to FIG. 4D are drawings describing a process according to one or more embodiments to scratch the surface of the optical fiber 100 with the blade member 13 in the case where the relative position between the optical fiber 100 and the blade member 13 is closer than in the case of FIG. 3A to FIG. 3D.

Concerning the above-described optical fiber cutting device 2 including the pair of clamps 11 and 12 and the blade member 13, when the optical fiber cutting device 2 scratches the surface of the optical fiber 100 (when putting the initial flaw on the surface), the outer peripheral edge portion 19 of the blade member 13 is pressed against the surface of the optical fiber 100 by moving the blade member 13 in the direction perpendicular to the longitudinal direction of the optical fiber 100 gripped by the pair of clamps 11 and 12, as illustrated in FIG. 3B to FIG. 3D and FIG. 4B to FIG. 4D.

Figure 3A:
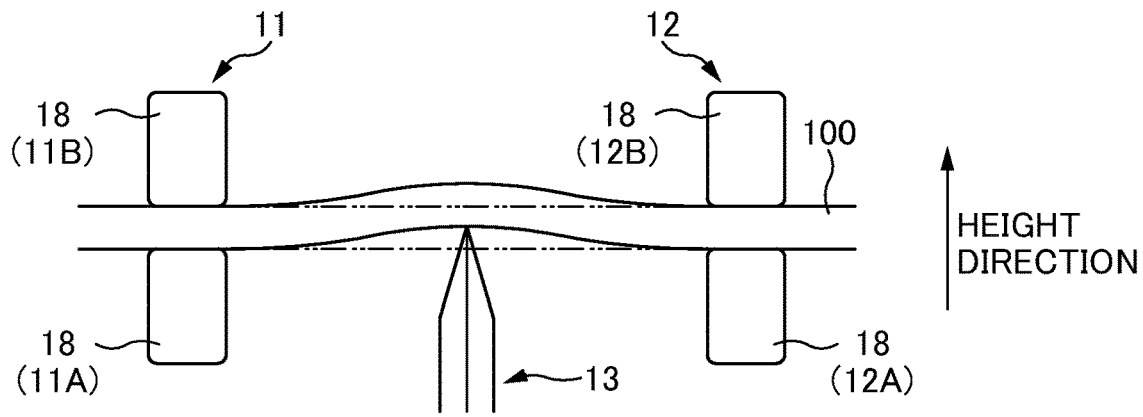
FIG. 3A to FIG. 3D are drawings describing a process according to one or more embodiments to scratch a surface of an optical fiber 100 with a blade member 13.
Figure 3B:
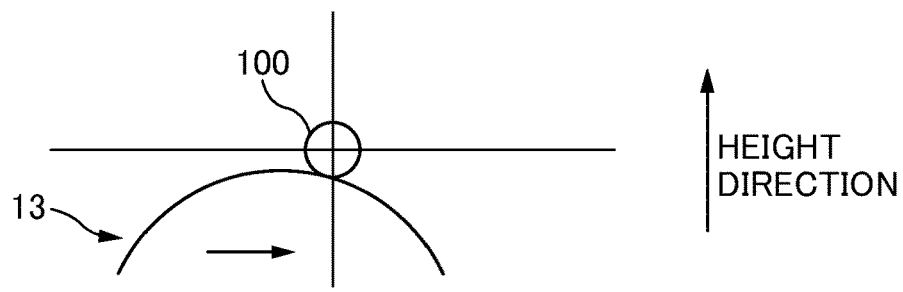
Figure 3C:
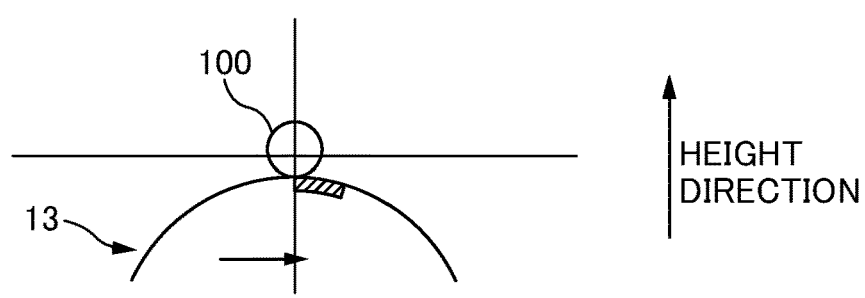
Figure 3D:
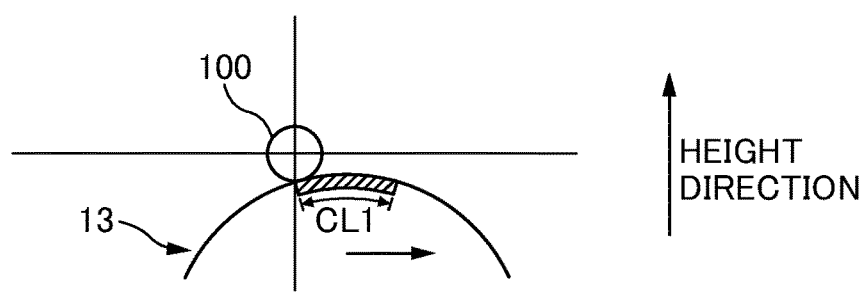
Figure 4A:
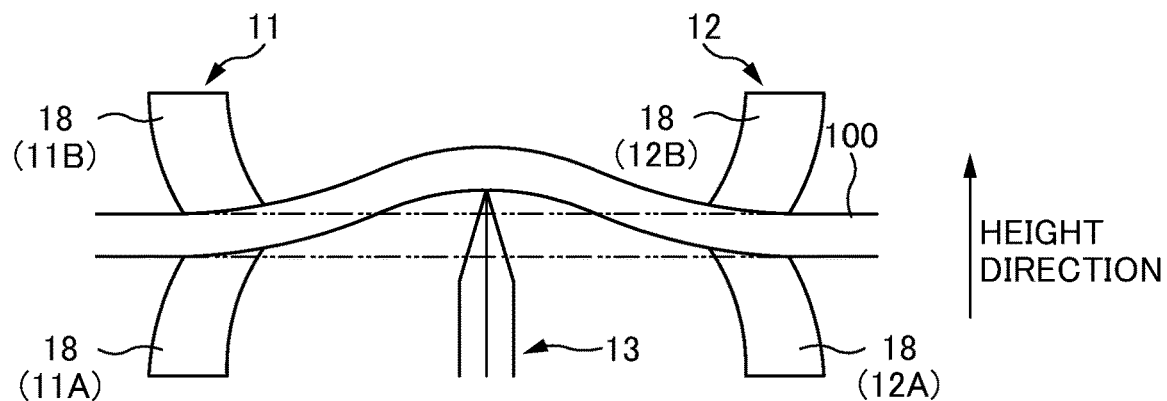
FIG. 4A to FIG. 4D are drawings describing a process according to one or more embodiments to scratch the surface of the optical fiber 100 with the blade member 13 in the case where a relative position between the optical fiber 100 and the blade member 13 is closer than in the case of FIG. 3A to FIG. 3D.
Figure 4B:
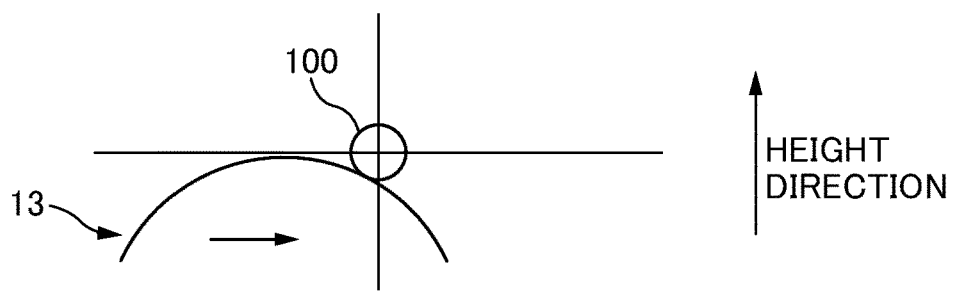
Figure 4C:
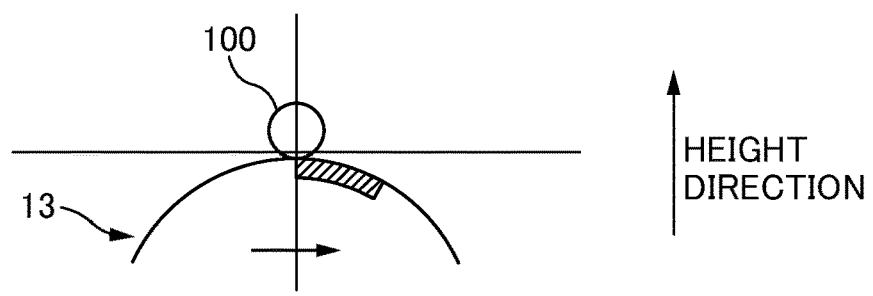
Figure 4D:
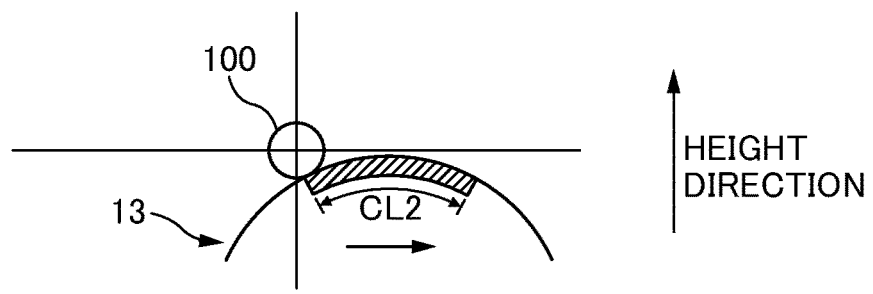

In this respect, as illustrated in FIG. 3A and FIG. 4A, the optical fiber 100 positioned between the pair of clamps 11 and 12 sags due to the pressing of the blade member 13. This brings the outer peripheral edge portion 19 of the blade member 13 into contact with the surface of the optical fiber 100 by a predetermined length in the circumferential direction. The following designates this predetermined length as "a contact length" of the blade member 13 by which the blade member 13 is in contact with the optical fiber 100. The contact length of the blade member 13 is indicated by reference numerals CL1 and CL2 in FIG. 3D and FIG. 4D.

The contact length of the blade member 13 changes according to the relative position in the height direction between the optical fiber 100 and the blade member 13. For example, as illustrated in FIG. 3A to FIG. 3D, in the case where the upper end of the blade member 13 is positioned at a relatively lower position with respect to the optical fiber 100, the sag of the optical fiber 100 is small (the contact pressure is low) and the contact length CL1 of the blade member 13 is short. Meanwhile, as illustrated in FIG. 4A to FIG. 4D, in the case where the upper end of the blade member 13 in the height direction is positioned at a higher position than in the case of FIG. 3A to FIG. 3D, the sag of the optical fiber 100 is large (the contact pressure is high) and the contact length CL2 of the blade member 13 is long. With the identical cutting performance of the outer peripheral edge portion 19 of the blade member 13, the longer contact length of the blade member 13 increases the degree of scratching the surface of the optical fiber 100.

The pressing member 14 illustrated in FIG. 2 scratches the surface of the optical fiber 100 with the blade member 13, and then presses and bends the scratched portion of the optical fiber 100 to cut the optical fiber 100.

In the above-described optical fiber cutting device 2, the blade member 13 is rotatable. Suppose that the blade member 13 repeatedly scratches optical fibers 100 by the predetermined (identical) outer peripheral edge portion 19 (a part of the outer peripheral edge portion 19 in the circumferential direction) and/or at a predetermined (identical) contact pressure. This causes wear of the predetermined outer peripheral edge portion 19, and due to the wear the cutting performance to cut the optical fiber 100 deteriorates (the wear includes an wear over time of the cutting edge of the blade member 13 and deterioration such as a defect over time). In this case, the blade member 13 is rotated to change a position of the outer peripheral edge portion 19 of the blade member 13 at which the blade member 13 is in contact with the optical fiber 100. Specifically, the blade member 13 is rotated so that another outer peripheral edge portion 19 adjacent to the predetermined outer peripheral edge portion 19 comes into contact with the optical fiber 100 at a time of scratching. This recovers the above-described cutting performance.

The above-described optical fiber cutting device 2 can change the relative position in the height direction between the optical fiber 100 and the blade member 13. Suppose that the blade member 13 repeatedly scratches optical fibers 100 by the predetermined (identical) outer peripheral edge portion 19 and/or at the predetermined (identical) contact pressure. This causes wear of the predetermined outer peripheral edge portion 19, and due to the wear the cutting performance to cut the optical fiber 100 deteriorates. In this case, the relative position in the height direction between the optical fiber 100 and the blade member 13 is changed so as to increase the contact pressure (so as to lengthen the contact length). This recovers the above-described cutting performance.

In the above-described explanation, whether or not the cutting performance deteriorates is determined by operator's checking the state of the end surface of the optical fiber 100 after the cutting, for example.

As illustrated in FIG. 1 and FIG. 2, the acquisition unit 10 acquires the position information of the outer peripheral edge portion 19 of the blade member 13 on which the blade member 13 is in contact with the optical fiber 100.

The acquisition unit 10 of this embodiment includes an outer-edge-position measurement sensor 15 that measures the rotation angle (the rotation position) of the blade member 13 as the position information of the outer peripheral edge portion 19 of the blade member 13 with respect to the optical fiber 100. In other words, the outer-edge-position measurement sensor 15 measures the position of the outer peripheral edge portion 19 of the blade member 13 on which the blade member 13 is in contact with the optical fiber 100. In this embodiment, the outer-edge-position measurement sensor 15 is disposed at the optical fiber cutting device 2.

The outer-edge-position measurement sensor 15 may continuously measure the rotation angle of the blade member 13 or may discretely measure the rotation angle. The number of measured rotation angles of the blade member 13 (positions of the outer peripheral edge portion 19) may be appropriately determined according to the diameter of the blade member 13 (in this embodiment, the number of measured rotation angles is 16). That is, in this embodiment, the number of positions of the outer peripheral edge portion 19 of the blade member 13 is 16; the positions can be used for cutting the optical fiber 100 and are arranged in the circumferential direction of the blade member 13.

Releasing the compressed spring starts moving the blade base 20. After the blade member 13 comes into contact with the optical fiber 100 during the movement, the blade base 20 is impacted at the end of the moving range and then stops. Therefore, if a sensor to measure the rotation position (and the height position) of the blade member 13 is disposed of the blade base 20, it is difficult to wire the sensor and also to guarantee the durability of the wiring. Accordingly, a sensor (e.g. for measuring the rotation position of the blade member 13) is disposed on the base 17 without moving together with the blade member 13 and the blade base 20.

In addition, assume that a plurality (16) of markers (reflective plates which reflect light or through-holes which transmit the light) are arranged circumferentially at regular intervals in the outer edge portion of the blade member 13, and that the outer-edge-position measurement sensor 15 detects one of the markers using a photosensor to measure the rotation position of the blade member 13. In this case, there is a possibility to fail accurate measure of the position because cutting dust and coating dust of the optical fiber affect the light which has detected by the photosensor. When measuring the rotation position of the blade member 13 using the photosensor, there is a possibility to fail accurate measure of the position because of ambient light from the outside of the device. Therefore, the outer-edge-position measurement sensor 15 of this embodiment uses a magnetic sensor that detects magnetism to measure the rotation position of the blade member 13.

Figure 5A:
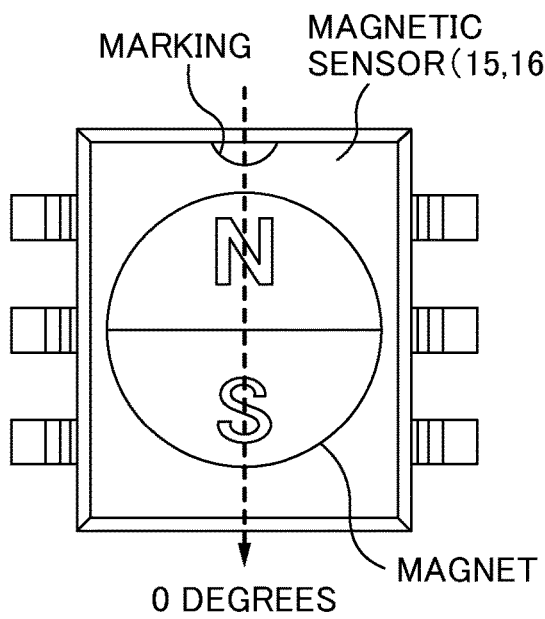
FIG. 5A to FIG. 5C are explanatory diagrams of a magnetic sensor according one or more embodiments.
Figure 5B:
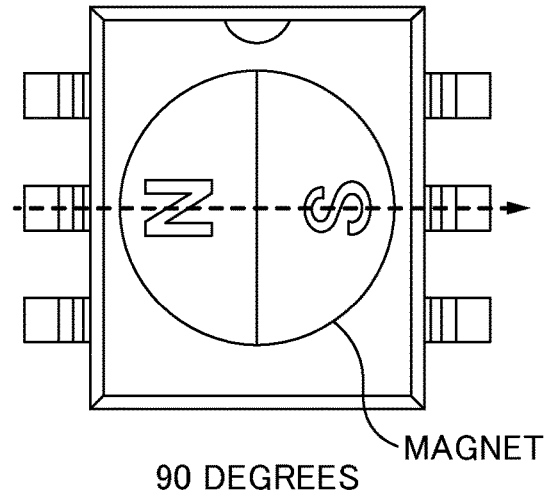
Figure 5C:
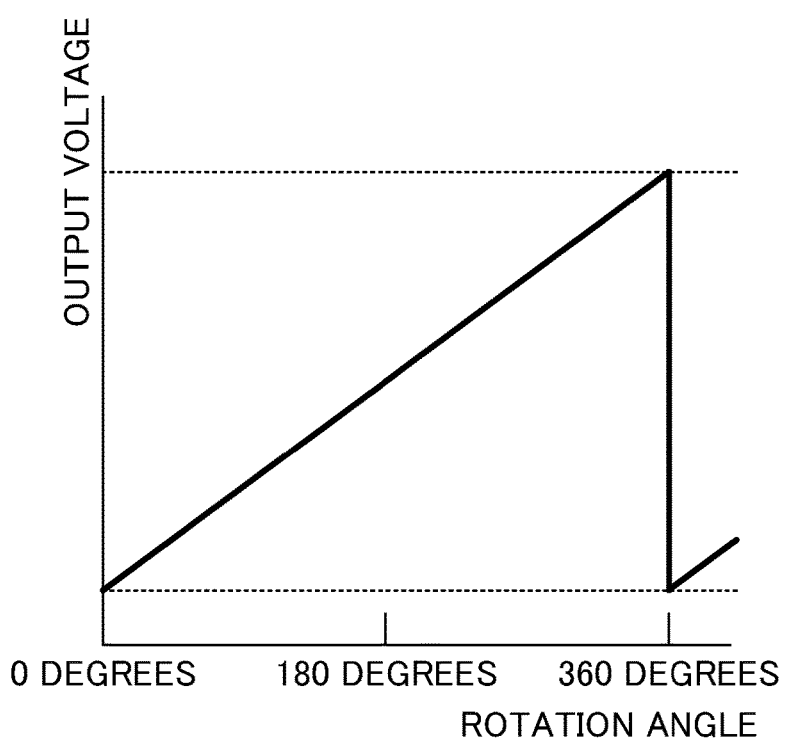

FIG. 5A to FIG. 5C are explanatory diagrams of the magnetic sensor according to one or more embodiments. FIG. 5A and FIG. 5B are drawings illustrating a relation between the magnetic sensor and a rotation position (a rotation angle) of a magnet. FIG. 5C is an explanatory diagram of output characteristics of the magnetic sensor.

The magnet is formed into a disk shape and diametrally magnetized. Here, as illustrated in FIG. 5A and FIG. 5B, the disk-shaped magnet is diametrally magnetized so that one side in a predetermined diametrical direction becomes an N-pole and the opposite side becomes an S-pole. The magnetic sensor is a so-called magnetic angular sensor. The magnetic sensor is a sensor that detects the direction of a magnetic line and that outputs a signal corresponding to the direction of the magnetic line.

As illustrated in FIG. 5A and FIG. 5B, a marking is put on a package of the magnetic sensor. Here, as illustrated in FIG. 5A, when the N-pole of the magnet faces toward the marking of the magnetic sensor, the rotation position of the magnet with respect to the magnetic sensor is defined as 0 degrees (a reference angle). As illustrated in FIG. 5B, an angle formed by counterclockwise rotation of the magnet from the reference angle with respect to the magnetic sensor is defined as "a rotation position of the magnet with respect to the magnetic sensor". For example, "the rotation position of the magnet with respect to the magnetic sensor" illustrated in FIG. 5B is "90 degrees".

As illustrated in FIG. 5C, according to the rotation position of the magnet with respect to the magnetic sensor, the magnetic sensor outputs the signal (an output voltage). Here, the output voltage of the magnetic sensor linearly changes when the rotation position of the magnet with respect to the magnetic sensor changes in a range of 0 degrees to 360 degrees. Note that, it is sufficient that the output voltage of the magnetic sensor has a correlation to the rotation position of the magnet with respect to the magnetic sensor; that is, the correlation is not necessary to be linearly changed.

Figure 6A:
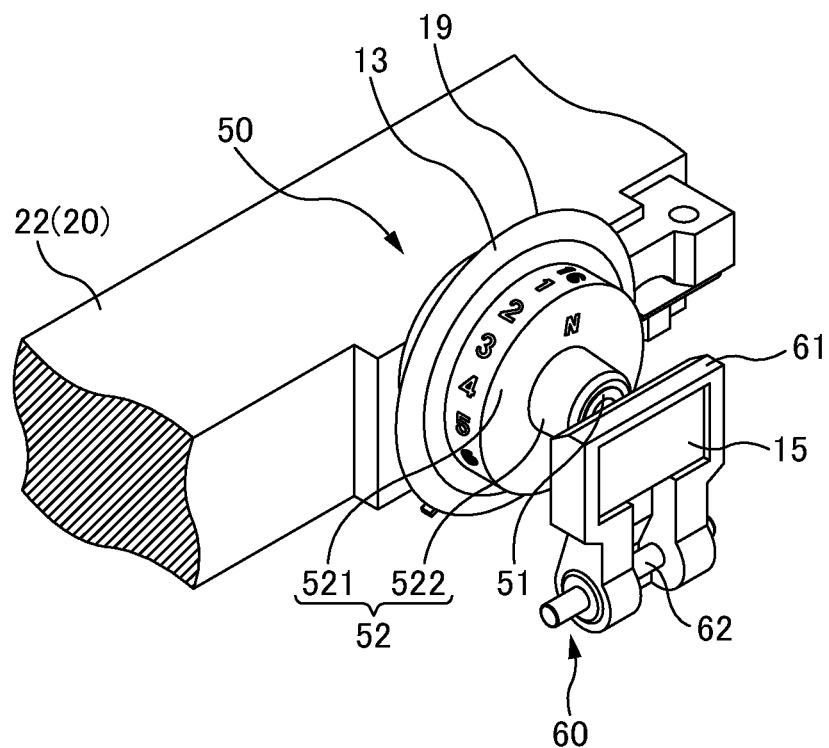
Figure 6B:
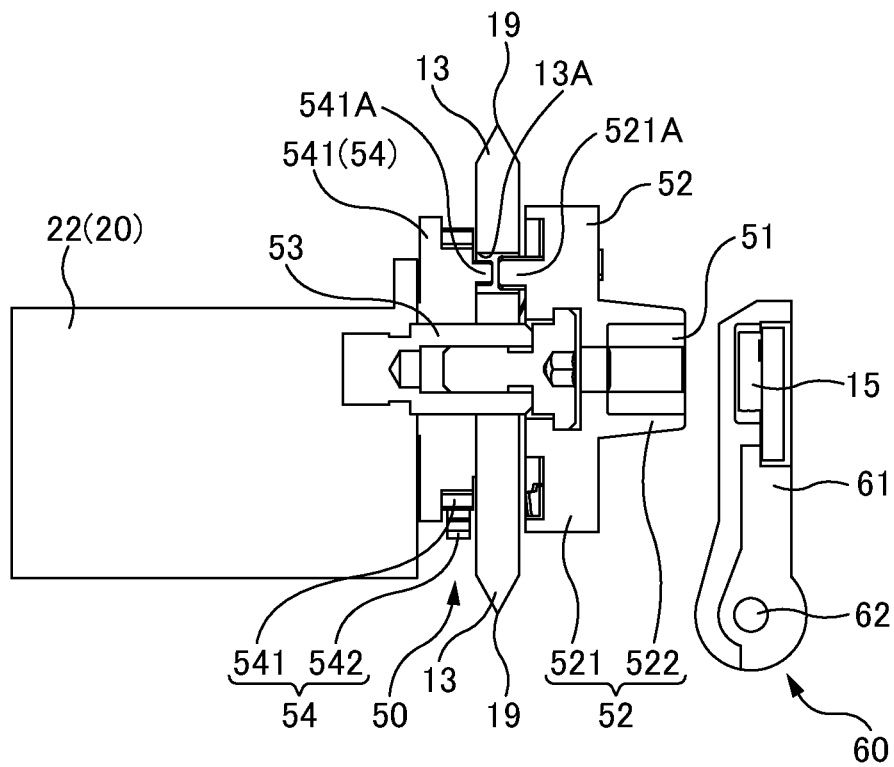
FIG. 6B is a cross-sectional view according to one or more embodiments describing the rotation unit 50 disposed on the blade member 13 side and the sensor-side unit 60 disposed on the outer-edge-position measurement sensor 15 side.
Figure 7:
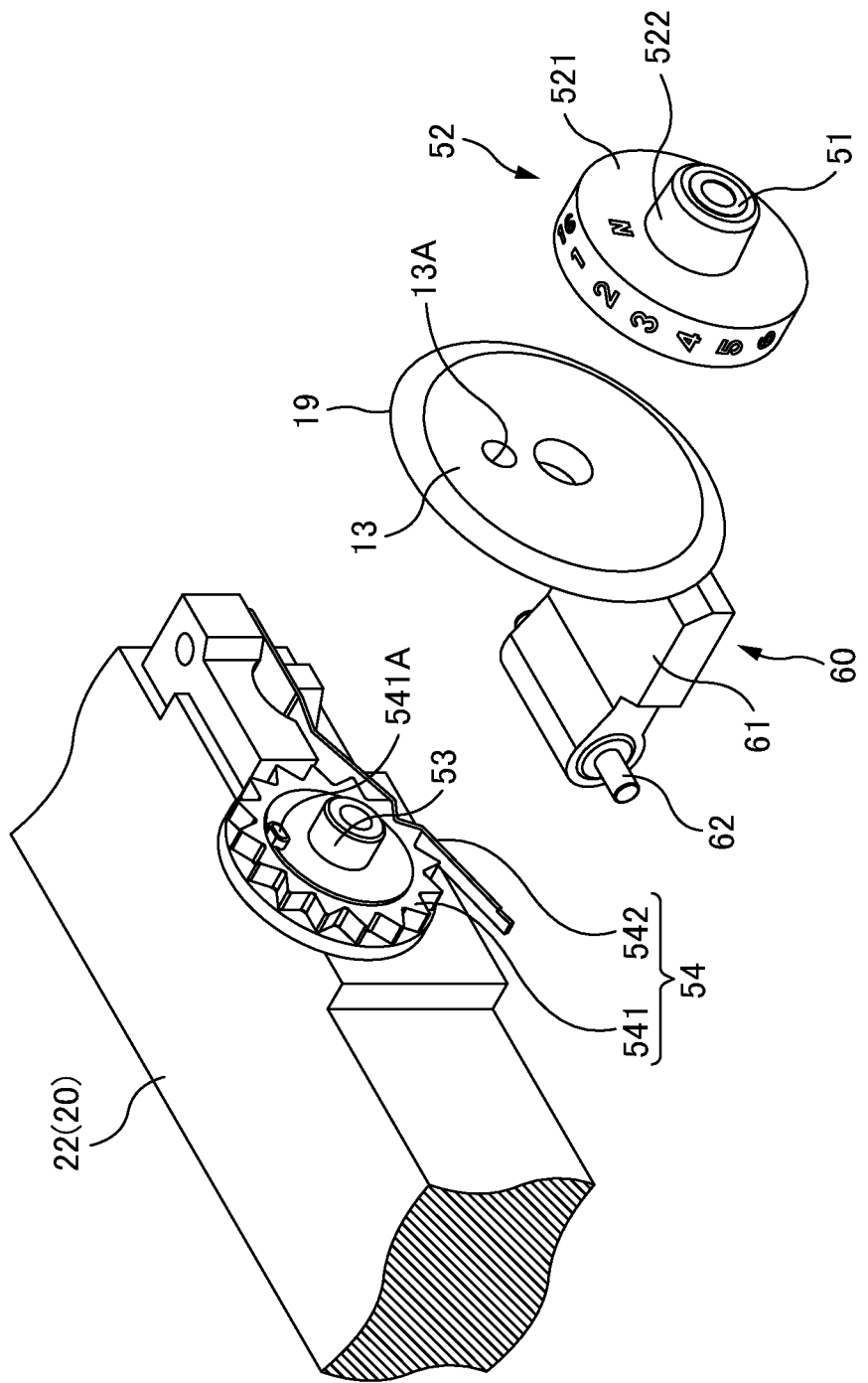
FIG. 7 is an exploded explanatory view of the rotation unit 50 according to one or more embodiments.

FIG. 6A is a perspective view according to one or more embodiments describing a rotation unit 50 disposed on a side close to the blade member and a sensor-side unit 60 disposed on a side close to the outer-edge-position measurement sensor 15. FIG. 6B is a cross-sectional view according to one or more embodiments describing the rotation unit 50 disposed on the blade member 13 side and the sensor-side unit 60 disposed on the outer-edge-position measurement sensor 15 side. FIG. 7 is an exploded explanatory view of the rotation unit 50.

The rotation unit 50 is a mechanism to hold the blade member 13 and a magnet 51 in a manner to be capable of rotating with respect to the blade base 20. Here, the rotation unit 50 is disposed of the oscillating portion 22. In addition to the blade member 13 and the magnet 51, the rotation unit 50 includes a pressing member 52, a rotation shaft 53, and the ratchet mechanism 54. The pressing member 52 is one example of the fixed component to fix the disk-shaped blade member 13. Here, the pressing member 52 is the fixed component to fix the blade member 13 to a ratchet disk of the ratchet mechanism 54. The pressing member 52 includes a flange part 521 and a protruding part 522. The flange part 521 is a flange-shaped part to press the side surface of the blade member 13. Indicators of the direction of the magnetic line of the magnet 51 are placed on the side surface of the flange part 521. The protruding part 522 is a part protruding from the flange part 521 toward the sensor. The magnet 51 is disposed of a surface of the protruding part 522 facing the sensor. The magnet 51 is foisted into a disk shape and diametrally magnetized. The ratchet mechanism 54 is a mechanism that holds the blade member 13 in a manner to be capable of switching between the unrotatable state and the rotatable state. The ratchet mechanism 54 includes a ratchet disk 541 and a ratchet pawl 542. A ratchet gear is formed on the outer peripheral portion of the ratchet disk 541. Engaging the ratchet pawl 542 with the ratchet disk 541 allows fixing the ratchet disk 541 in a state of staying at a predetermined rotation position while the rotation of the ratchet disk 541 is permitted.

Instead of disposing the magnet 51 of the pressing member 52, the blade member 13 may include a magnet. In this case as well, the magnetized blade member 13 generates the magnetic line. Accordingly, the outer-edge-position measurement sensor 15 including the magnetic sensor can detect the magnetic line generated by the blade member 13, and can output the signal corresponding to the rotation position of the blade member 13. This can simplify the configuration of the pressing member 52.

The blade member 13 has a fitting hole 13A. The ratchet disk 541 has a projected portion 541A which is fitted to the fitting hole 13A on the blade member 13. The pressing member 52 has a projected portion 521A (see FIG. 6B) which is also fitted to the fitting hole 13A on the blade member 13. Thus, the blade member 13 and the pressing member 52 are fixed to the ratchet disk 541, and the magnet 51 disposed of the pressing member 52 is rotatably held together with the blade member 13.

The sensor-side unit 60 is a mechanism to rotatably hold the outer-edge-position measurement sensor 15 (the magnetic sensor). The sensor-side unit 60 includes an oscillating member 61 and a sensor rotation shaft 62. The oscillating member 61 is a member that is capable of rotating about the sensor rotation shaft 62 while holding the outer-edge-position measurement sensor 15 serving as the magnetic sensor. As illustrated in FIG. 6A and FIG. 6B, the ordinary position of rotation of the oscillating member 61 is a position where the outer-edge-position measurement sensor 15 can face the magnet 51. As illustrated in FIG. 7, rotating the oscillating member 61 from the ordinary position moves the outer-edge-position measurement sensor 15 to a position where the sensor 15 does not face the magnet 51. For example, at a time of replacing the blade member 13, rotating the oscillating member 61 and moving the outer-edge-position measurement sensor 15 aside enables removing the pressing member 52 including the magnet 51.

The outer-edge-position measurement sensor 15 is composed of the magnetic sensor, and detects the magnetic line generated by the magnet 51 and outputs the signal corresponding to the rotation position of the magnet 51. Accordingly, even if cutting dust and coating dust of the optical fiber 100 enter between the outer-edge-position measurement sensor 15 and the magnet 51, the outer-edge-position measurement sensor 15 can output the signal corresponding to the rotation position of the magnet 51 without being affected by the cutting dust and the coating dust of the optical fiber 100. Additionally, even if the ambient light enters from the outside, the outer-edge-position measurement sensor 15 can output the signal corresponding to the rotation position of the magnet 51 without being affected by the ambient light. Therefore, the outer-edge-position measurement sensor 15 can accurately measure the rotation position (the rotation position) of the blade member 13. The rotation angle (the measured value) of the blade member 13 measured by the outer-edge-position measurement sensor 15 is output from the outer-edge-position measurement sensor 15 in the form of an electric signal, for example.

The acquisition unit 10 of this embodiment acquires information of the relative position in the height direction between the optical fiber 100 and the outer peripheral edge portion 19 of the blade member 13. Specifically, the acquisition unit 10 of this embodiment includes a contact length measurement sensor 16 (a position measurement sensor) that measures as the above-described relative position information the position of the outer peripheral edge portion 19 of the blade member 13 in the height direction (the height position of the blade member 13). In this embodiment, the contact length measurement sensor 16 is disposed of the optical fiber cutting device 2.

The contact length measurement sensor 16 may continuously measure the height position of the blade member 13, and in this embodiment the contact length measurement sensor 16 discretely measures the height position. The number of measured height positions of the blade member 13 may be any number, and in this embodiment three height positions are employed: "low", "middle", and "high". That is, in this embodiment, three height positions of the blade member 13 are available for cutting the optical fiber 100 at the position of the identical outer peripheral edge portion 19.

Accordingly, in this embodiment, 48 positions of the blade member 13 in total are available for cutting the optical fiber 100; 48 is obtained by multiplying 16, the number of circumferential positions of the outer peripheral edge portion 19 of the blade member 13, by 3, the number of height positions of the blade member 13.

The contact length measurement sensor 16 is located, for example, facing the head of the adjusting screw 23 as illustrated in FIG. 2 (In FIG. 2, for illustration of the magnet 24 in the head of the adjusting screw 23, the contact length measurement sensor 16 is transparently illustrated by the dotted line). The adjusting screw 23 is a rotating member that adjusts the height position of the leading end part of the oscillating portion 22. Rotating the adjusting screw 23 adjusts an amount by which the lower end of the adjusting screw 23 protrudes from the lower surface of the oscillating portion 22. This adjusts the height position of the leading end part of the oscillating portion 22, to adjust the height position of the blade member 13. The magnet 24 is disposed of the head of the adjusting screw 23. Here, the head of the adjusting screw 23 is formed into a disk shape. The head of the adjusting screw 23 is magnetized so that a magnetic line is along a direction of a diameter of the disk-shaped head (a direction perpendicular to the rotation axis of the adjusting screw 23). Note that, instead of magnetizing the head of the adjusting screw 23, the fixed component fixed to the adjusting screw 23 (the component rotating together with the adjusting screw 23) may be magnetized so that the magnetic line is in a direction perpendicular to the rotation axis of the adjusting screw 23. Alternatively, both the adjusting screw 23 and the fixed component fixed to the adjusting screw 23 may be magnetized so that the magnetic line is in a direction perpendicular to the rotation axis of the adjusting screw 23.

The contact length measurement sensor 16 as the magnetic sensor detects the magnetic line generated by the magnet 24 at the head of the adjusting screw 23, and the sensor 16 outputs the signal corresponding to the rotation position of the magnet 24. Accordingly, even if cutting dust and coating dust of the optical fiber 100 enter between the contact length measurement sensor 16 and the adjusting screw 23, the contact length measurement sensor 16 can output the signal corresponding to the rotation position of the adjusting screw 23 without being affected by the cutting dust and the coating dust of the optical fiber 100. Even if the ambient light enters from the outside, the contact length measurement sensor 16 can output the signal corresponding to the rotation position of the adjusting screw 23 without being affected by the ambient light. Therefore, the contact length measurement sensor 16 can accurately measure the height position of the blade member 13. The height position of the blade member 13 measured by the contact length measurement sensor 16 (the measured value) is output from the contact length measurement sensor 16 in the form of the electric signal, for example.

The above-described outer-edge-position measurement sensor 15 and contact length measurement sensor 16 are disposed of the optical fiber cutting device 2.

The outer-edge-position measurement sensor 15 and the contact length measurement sensor 16 may be located on the base 17 so that they acquire the position information of the blade member 13 in a state where the outer peripheral edge portion 19 of the blade member 13 is placed at a position (e.g. a standby position), the position being away from a position where the blade member 13 is in contact with the optical fiber 100, in the direction of movement of the blade member 13, as exemplified in FIG. 2. This ensures easily setting, for example, positions of electrical wirings (not illustrated) extending from the outer-edge-position measurement sensor 15 and the contact length measurement sensor 16.

The outer-edge-position measurement sensor 15 and the contact length measurement sensor 16 may be disposed of the base portion 21 of the blade base 20, for example. This allows acquiring the position information of the blade member 13 at any position in the direction of movement of the blade member 13.

The operating unit 3 illustrated in FIG. 1 operates maintenance information regarding the blade member 13, based on the position information acquired by the outer-edge-position measurement sensor 15 and the contact length measurement sensor 16.

The maintenance information, for example, may contain information for recovering the performance to cut the optical fiber 100 when the cutting performance deteriorates due to wear of the predetermined outer peripheral edge portion 19 of the blade member 13. Specifically, this information is one indicating the position of the outer peripheral edge portion 19 which will be used next to cut the optical fiber 100 (another position different from the predetermined outer peripheral edge portion 19) and/or the height position of the blade member 13 (hereinafter referred to as "a next destination position of the blade member 13").

For calculating "the next destination position of the blade member 13", employed is information indicating a correct order of use of the plurality (48) of positions of the blade member 13 which are used to cut the optical fiber 100 (hereinafter referred to as "a correct order of use of the blade member 13"). This information is preliminary stored in the storage unit 4 described later.

In this embodiment, the information of "the correct order of use of the blade member 13" includes the following procedures A to E in this order.

The procedure A: The position of the blade member 13 that is initially used to cut the optical fiber 100 (the initial position) is set to a position where the height position of the blade member 13 is "low". The circumferential position of the outer peripheral edge portion 19 of the blade member 13 is "No. 1". That is, "the height position of the blade (the blade height): low, the position of the outer peripheral edge portion 19 of the blade member 13 (the blade angle): No. 1". Note that the numbers "No. 1", "No. 2", . . . "No. 16" are assigned to the circumferential positions of the outer peripheral edge portion 19 of the blade member 13.

The procedure B: In the foregoing state, concerning the blade member being in contact with the optical fiber 100, every time when the outer peripheral edge portion 19 of the predetermined number wears away, the blade member 13 is rotated to change the circumferential position of the outer peripheral edge portion 19 in the order of "No. 1", "No. 2", "No. 3", . . . "No. 15" to "No. 16".

The procedure C: When the blade member 13 rotates one revolution and the position returns to "No. 1", the height position of the blade member 13 is changed from "low" to "middle". That is, after the use of the position "the blade height: low and the blade angle: No. 16", used is the position of "the blade height: middle and the blade angle: No. 1".

The procedure D: While holding the height position of the blade member 13 to "middle", the circumferential position of the outer peripheral edge portion 19 is changed in the order of "No. 1", "No. 2", "No. 3", . . . "No. 15" to "No. 16" in the similar manner to "the procedure B".

The procedure E: When the blade member 13 rotates one revolution and returns to "No. 1", the position of the blade member 13 is changed in the similar manner to "the procedure C"; from "the blade height: middle and the blade angle: No. 16" to "the blade height: high and the blade angle: No. 1".

The procedure F: While holding the height position of the blade member 13 to "high", the circumferential position of the outer peripheral edge portion 19 is changed in the order of "No. 1", "No. 2", "No. 3", . . . "No. 15" to "No. 16" in the similar manner to "the procedure B". When the use with "the blade height: high and the blade angle: No. 16" is completed (the cutting performance deteriorates), the use of the blade member 13 itself is terminated.

Accordingly, in this embodiment, in the case where the current state of the blade member 13 is "the blade height: middle and the blade angle: No. 16", "the next destination position of the blade member 13" calculated by the operating unit 3 is "the blade height: high and the blade angle: No. 1" based on the above-described information of "the correct order of use of the blade member 13".

The maintenance information, for example, may contain information indicating a degree of exhaustion of the blade member 13. The degree of exhaustion of the blade member 13 is a proportion of the number of positions of the blade member 13 which have been already used for cutting the optical fiber 100 as the numerator to the total number of positions of the blade member 13 available for cutting the optical fiber 100 (48 positions) as the denominator, for example. When 36 positions of the blade member 13 have already been used, the degree of exhaustion of the blade member 13 is 75%.

The maintenance information, for example, may include information indicating the remaining product life of the blade member 13. The remaining product life of the blade member 13 is a proportion of the number of positions of the blade member 13 which have not used yet for cutting the optical fiber 100 as the numerator to the total number of positions of the blade member 13 available for cutting the optical fiber 100 (48 positions) as the denominator, for example. When 12 positions of the blade member 13 have not used yet, the remaining product life of the blade member 13 is 25%.

The maintenance information may contain information indicating estimated replacement time of the blade member 13 (e.g. after 42 days), for example. In this case, the information indicating the estimated replacement time of the blade member 13 may be calculated in such a manner of using as the reference an estimated value of the number of positions of the blade member 13 which will be used per day.

The storage unit 4 stores the above-described maintenance information and information of the position of the blade member 13 with respect to the optical fiber 100. The storage unit 4 stores information such as the above-described "correct order of use of the blade member 13" and total number of positions of the blade member 13 available for cutting the optical fiber 100 (48 positions). The various types of information stored in the storage unit 4 are appropriately read out by the operating unit 3 in some cases.

The display unit 5 displays the position information and the maintenance information of the blade member 13. The following types of information are provided as examples: information of the current position of the blade member 13; information of the correct current position of the blade member 13, which has been calculated by the operating unit 3; information of "the next destination position of the blade member 13", which has been calculated by the operating unit 3; information warning the operator about occurrence of a movement mistake; information of the remaining product life of the blade member 13, which has been calculated by the operating unit 3; and information notifying the operator of the replacement of the blade member 13. The position information of the blade member 13 displayed in the display unit 5 includes information indicating the circumferential position of the outer peripheral edge portion 19 and information indicating the height position of the blade member 13. Any method may be employed for displaying the various types of information displayed in the display unit 5; for example, a numeral display and a graphic display. The display unit 5 may display an operating button or the like.

As described above, in the optical fiber cutting system 1 of this embodiment, the acquisition unit 10 acquires information of the position of the outer peripheral edge portion 19 of the blade member 13 where the blade member 13 is in contact with the optical fiber 100. Thus, it is possible to obtain accurately the position of the outer peripheral edge portion 19 of the blade member 13 with respect to the optical fiber 100. This can appropriately reduce the movement mistake of the blade member 13, which is caused by misoperations of the operator. Consequently, the blade member 13 can be used without waste.

Especially, in the optical fiber cutting system 1 of this embodiment, the acquisition unit 10 is a sensor that acquires the position information of the outer peripheral edge portion 19 of the blade member 13 by detecting the direction of the magnetic line corresponding to the position of the outer peripheral edge portion 19 (the outer-edge-position measurement sensor 15 and the contact length measurement sensor 16). This allows acquiring the position information of the outer peripheral edge portion 19 without being affected by cutting dust and coating dust of the optical fiber 100, the ambient light or the like. Therefore, it is possible to obtain accurately the position of the outer peripheral edge portion 19 of the blade member 13.

In the optical fiber cutting system 1 of this embodiment, the position information of the outer peripheral edge portion 19 acquired by the acquisition unit 10 is the rotation angle (the rotation position) of the disk-shaped blade member 13. It is possible to obtain accurately the rotation angle of the blade member 13 (the position of the outer peripheral edge portion 19 of the blade member 13 where the blade member 13 is in contact with the optical fiber 100).

In this embodiment, the magnet 51 is mounted to the blade member 13, and the magnet 51 generates magnetic line. Accordingly, in this embodiment, the blade member 13 and the magnet 51 are separate components. Therefore, the material of the blade member 13 is less limited than in a configuration in which the blade member 13 is magnetized and in which the blade member 13 itself generates the magnetic line. Note that, the blade member 13 may be magnetized through an application of the strong magnetic field and the magnetized blade member 13 itself may generate the magnetic line. This makes it possible to simplify the configuration of the components.

In this embodiment, the magnet 51 is mounted to the pressing member 52, which is one example of the fixed component fixed to the blade member 13. Accordingly, the magnet 51 can be rotated according to the rotation position of the blade member 13. The direction of the magnetic line changes according to the rotation position of the blade member 13, and therefore the acquisition unit 10 can accurately acquire the rotation position of the blade member 13, based on the direction of the magnetic line detected by the outer-edge-position measurement sensor 15. It is sufficient for the magnet 51 to be mounted to the fixed component fixed to the blade member 13; therefore, the magnet 51 may be mounted to a member different from the pressing member 52.

In the optical fiber cutting system 1 of this embodiment, the position information of the outer peripheral edge portion 19 acquired by the acquisition unit 10 indicates the relative position in the height direction between the blade member 13 and the optical fiber 100. Especially, the acquisition unit 10 includes the contact length measurement sensor 16, and the sensor 16 measures as the relative position information the position of the outer peripheral edge portion 19 of the blade member 13 in the height direction. This makes it possible to accurately obtain the relative position in the height direction between the optical fiber 100 and the blade member 13 (the height position of the blade member 13). In this embodiment, the contact length measurement sensor 16 is the magnetic sensor; therefore, without being affected by cutting dust and coating dust of the optical fiber 100, the ambient light or the like, it is possible to acquire the position information of the outer peripheral edge portion 19 which detects the relative position in the height direction between the blade member 13 and the optical fiber 100.

The optical fiber cutting system 1 of this embodiment includes an adjustment mechanism, and the adjustment mechanism adjusts according to the rotation position of the adjusting screw 23 the relative position in the height direction between the blade member 13 and the optical fiber 100. In this embodiment, the adjusting screw 23 (and/or the fixed component fixed to the adjusting screw 23) is/are magnetized so that a magnetic line is along a direction perpendicular to the rotation axis of the adjusting screw 23. The acquisition unit 10 (the contact length measurement sensor 16) detects the direction of the magnetic line, and thereby acquires the relative position in the height direction between the blade member 13 and the optical fiber 100. This makes it possible to accurately acquire the height position of the blade member 13.

In this embodiment, the adjusting screw 23 (and/or the fixed component fixed to the adjusting screw 23) is/are magnetized through the application of the strong magnetic field. And, the component(s) which has/have been magnetized (for example, the adjusting screw 23) itself generates the magnetic line. This makes it possible to simplify the configuration of the components. A magnet may be mounted to the adjusting screw 23 and/or the fixed component, and the magnet may generate the magnetic line. Thus, the adjusting screw 23 and the like are separate components from the magnet, and therefore the material of the adjusting screw 23 and the like is less limited.

In the optical fiber cutting system 1 of this embodiment, it is possible to notify "the next destination position of the blade member 13" to the operator because the system includes the operating unit 3, the storage unit 4 and the display unit 5 as well as the acquisition unit 10, which acquires the position information of the outer peripheral edge portion 19 of the blade member 13 with respect to the optical fiber 100. This makes it possible to appropriately reduce the movement mistake of the blade member 13 by the operator.

Further, even if the movement mistake occurs, it can be notified (warned) to the operator. This makes it possible to further reduce the movement mistake of the blade member 13 by the operator.

In the optical fiber cutting system 1 of this embodiment, including the acquisition unit 10, the operating unit 3, the storage unit 4, and the display unit 5 makes it possible to notify the operator of the maintenance information such as the degree of exhaustion, the remaining product life, the estimated replacement time, and an replacement instruction of the blade member 13. Therefore, it is possible to appropriately prepare for replacement of the blade member 13. For example, when the degree of exhaustion of the blade member 13 closes to 100% (the remaining product life closes to 0%) or when the replacement timing of the blade member 13 is close, the unused blade member 13 can be prepared in advance. In other words, this eliminates the need for carrying the unused blade member 13 all the time, facilitating the handling of the optical fiber cutting device 2.

In the optical fiber cutting system 1 of this embodiment, the optical fiber cutting device 2 includes the operating unit 3, the storage unit 4 and the display unit 5, and these units treat the position information of the blade member 13 acquired by the acquisition unit 10 and the maintenance information calculated based on the position information. Accordingly, compared with the case of disposing the operating unit 3, the storage unit 4, and the display unit 5 separately from the optical fiber cutting device 2, this configuration allows minimizing the operation by the operator (for example, a motion of the operator's line of sight). That is, the operator can easily treat the optical fiber cutting system 1.

Figure 8:
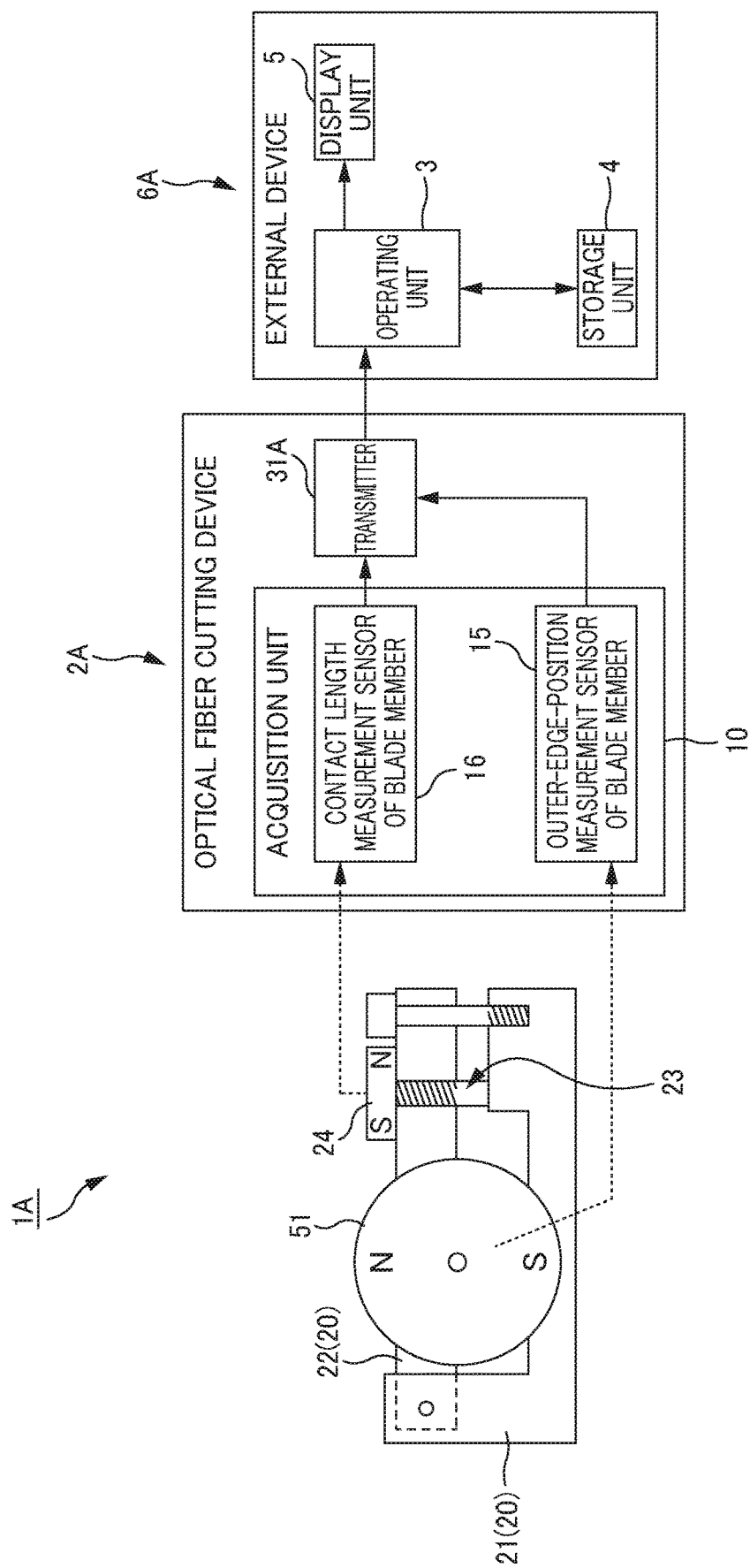
FIG. 8 is a block diagram illustrating an optical fiber cutting system of a second embodiment.

The following describes the second embodiment mainly in differences from the first embodiment with reference to FIG. 8. Like reference numerals designate corresponding or identical elements throughout the configurations in common between the first embodiment and the second embodiment, and therefore such elements will not be further elaborated here.

As illustrated in FIG. 8, an optical fiber cutting system 1A of this embodiment includes an optical fiber cutting device 2A, the outer-edge-position measurement sensor 15, the contact length measurement sensor 16, the operating unit 3, the storage unit 4, and the display unit 5 similar to the first embodiment. The configuration of the optical fiber cutting device 2A may be similar to the optical fiber cutting device 2 of the first embodiment. The outer-edge-position measurement sensor 15 and the contact length measurement sensor 16 are disposed of the optical fiber cutting device 2A similar to the first embodiment. The functions of the operating unit 3, the storage unit 4, and the display unit 5 are similar to the first embodiment.

In the optical fiber cutting system 1A of this embodiment, the position information of the blade member 13 is transmitted to an external device 6A which is not included in the optical fiber cutting device 2A, the position information being measured by the outer-edge-position measurement sensor 15 and the contact length measurement sensor 16 (the rotation angle of the blade member 13 and the height position of the blade member 13). That is, the optical fiber cutting device 2A of this embodiment includes a transmitter 31A to transmit to the external device 6A the position information of the blade member 13 which has been output from the outer-edge-position measurement sensor 15 and the contact length measurement sensor 16.

The external device 6A may be, for example, a fusion splicing device coupling the mutual optical fibers 100 (the optical fiber core wires). Or the external device 6A may be any device that can handle the position information of the blade member 13, such as a mobile phone, a personal computer, and a cloud data server.

The external device 6A includes a receiver (not illustrated) that receives the position information of the blade member 13 transmitted from the optical fiber cutting device 2A. A line transmitting the information from the optical fiber cutting device 2A to the external device 6A may be wireless or wired.

In the optical fiber cutting system 1A of this embodiment, the operating unit 3, the storage unit 4, and the display unit 5 are disposed of the above-described external device 6A. Thus, the external device 6A calculates the maintenance information, etc. based on the position information of the blade member 13, and stores and displays the information.

The optical fiber cutting system 1A of this embodiment provides the effects similar to the first embodiment.

Furthermore, the optical fiber cutting system 1A of this embodiment includes the operating unit 3, the storage unit 4, and the display unit 5 which are disposed of the above-described external device 6A. Accordingly, compared with the optical fiber cutting system 1 of the first embodiment, the optical fiber cutting device 2A can be compact and the cost can be reduced. Making the optical fiber cutting device 2A compact makes it easy to carrying it, and this is effective, in particular, to outdoor use.

Figure 9:
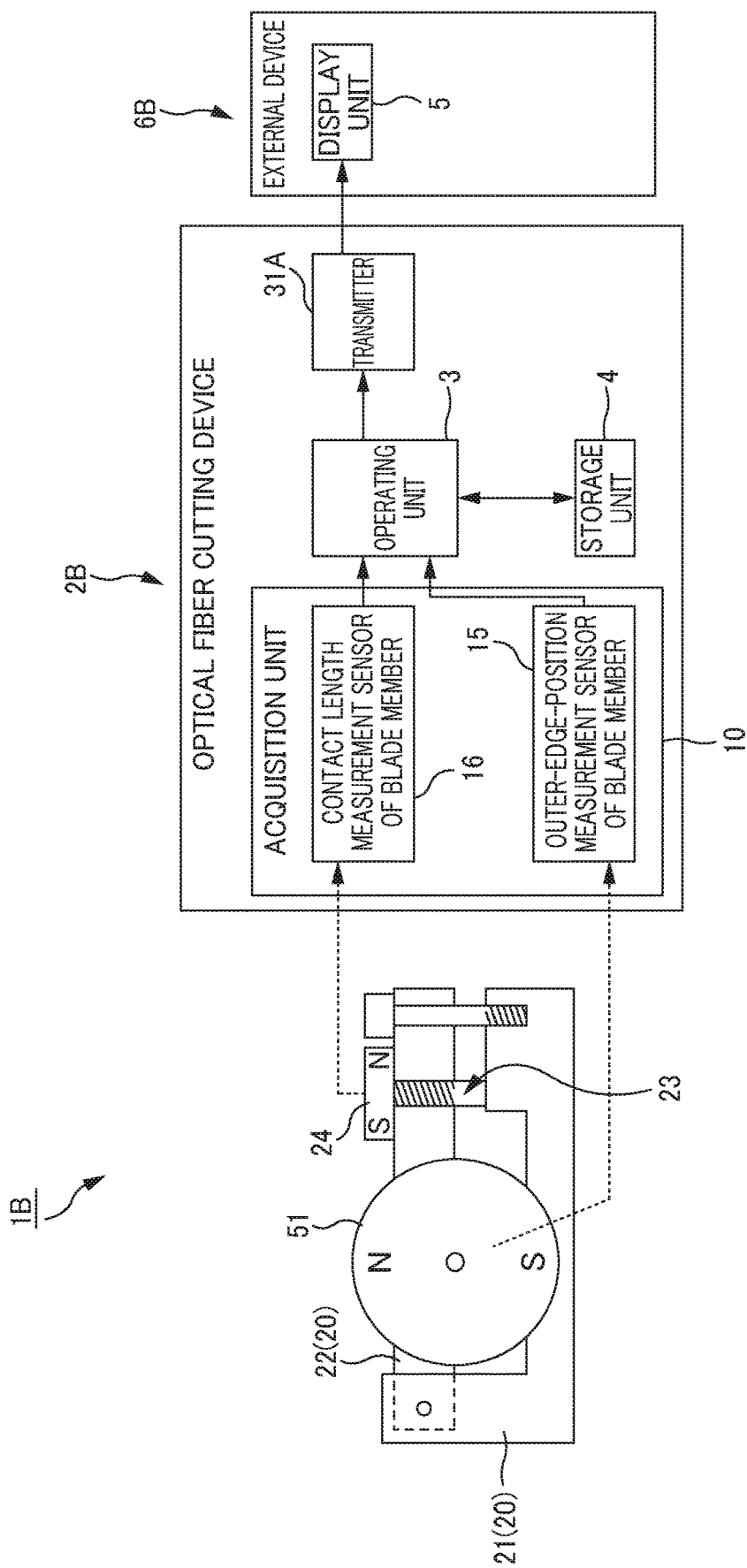
FIG. 9 is a block diagram illustrating an optical fiber cutting system of a third embodiment.

The following describes the third embodiment mainly in differences from the first and the second embodiments with reference to FIG. 9. Like reference numerals designate corresponding or identical elements throughout the configurations in common between the first and the second embodiments and the third embodiment, and therefore such elements will not be further elaborated here.

As illustrated in FIG. 9, an optical fiber cutting system 1B of this embodiment includes an optical fiber cutting device 2B, the outer-edge-position measurement sensor 15, the contact length measurement sensor 16, the operating unit 3, the storage unit 4, and the display unit 5 similar to the first embodiment. The configuration of the optical fiber cutting device 2B may be similar to the optical fiber cutting device 2 of the first embodiment. The outer-edge-position measurement sensor 15 and the contact length measurement sensor 16 are disposed of the optical fiber cutting device 2B similar to the first embodiment. The functions of the operating unit 3, the storage unit 4, and the display unit 5 are similar to the first embodiment.

In the optical fiber cutting system 1B of this embodiment, the following information is transmitted to an external device 6B which is not included in the optical fiber cutting device 2B: the position information of the blade member 13 measured by the outer-edge-position measurement sensor 15 and the contact length measurement sensor 16; and the maintenance information calculated based on the position information of the blade member 13. That is, the optical fiber cutting device 2B of this embodiment includes the transmitter 31A similar to the second embodiment.

A concrete example of the external device 6B may be similar to the example exemplified in the second embodiment.

In the optical fiber cutting system 1B of this embodiment, the operating unit 3 and the storage unit 4 is disposed of the optical fiber cutting device 2B, and the display unit 5 is disposed of the external device 6B. Accordingly, among information such as the position information and the maintenance information of the blade member 13, only the information to be displayed in the display unit 5 is transmitted to the external device 6B.

The optical fiber cutting system 1B of this embodiment provides the effects similar to the first and the second embodiments.

Furthermore, the optical fiber cutting system 1B of this embodiment includes the display unit 5 disposed of the external device 6B. Accordingly, compared with the optical fiber cutting system 1 of the first embodiment, the optical fiber cutting device 2B can be compact and the cost can be reduced.

Figure 10:
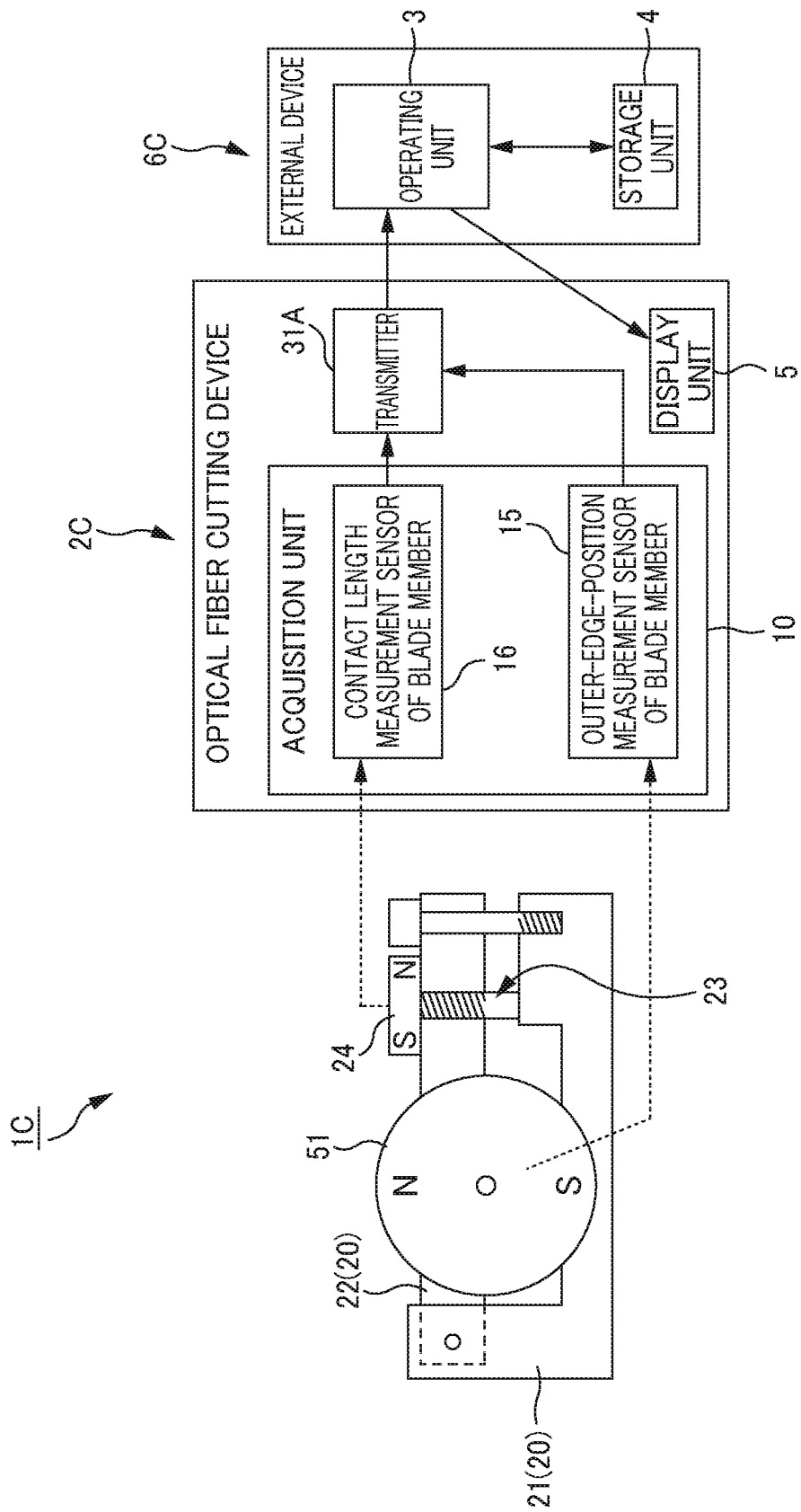
FIG. 10 is a block diagram illustrating an optical fiber cutting system of a fourth embodiment.

The following describes the fourth embodiment mainly in differences from the first and the second embodiments with reference to FIG. 10. Like reference numerals designate corresponding or identical elements throughout the configurations in common between the first and the second embodiments and the fourth embodiment, and therefore such elements will not be further elaborated here.

As illustrated in FIG. 10, an optical fiber cutting system 1C of this embodiment includes an optical fiber cutting device 2C, the outer-edge-position measurement sensor 15, the contact length measurement sensor 16, the operating unit 3, the storage unit 4, and the display unit 5 similar to the first embodiment. The configuration of the optical fiber cutting device 2C may be similar to the optical fiber cutting device 2 of the first embodiment. The outer-edge-position measurement sensor 15 and the contact length measurement sensor 16 are disposed of the optical fiber cutting device 2C similar to the first embodiment. The functions of the operating unit 3, the storage unit 4, and the display unit 5 are similar to the first embodiment.

In the optical fiber cutting system 1C of this embodiment, similar to the second embodiment, the position information of the blade member 13 is transmitted to an external device 6C which is not included in the optical fiber cutting device 2C, the position information being measured by the outer-edge-position measurement sensor 15 and the contact length measurement sensor 16. That is, the optical fiber cutting device 2C of this embodiment includes the transmitter 31A similar to the second embodiment.

A concrete example of the external device 6C may be similar to the example exemplified in the second embodiment.

In the optical fiber cutting system 10 of this embodiment, the operating unit 3 and the storage unit 4 is disposed of the external device 6C, and the display unit 5 is disposed of the optical fiber cutting device 2C. Accordingly, the external device 6C calculates the maintenance information, etc. based on the position information of the blade member 13, and stores the information.

Among information such as the position information and the maintenance information of the blade member 13, the information to be displayed in the display unit 5 is transmitted from the external device 6C to the optical fiber cutting device 2C. That is, the external device 6C includes a transmitter (not illustrated) that transmits to the optical fiber cutting device 2C the information to be displayed in the display unit 5. The optical fiber cutting device 2C includes a receiver (not illustrated) that receives the information to be displayed in the display unit 5.

The optical fiber cutting system 10 of this embodiment provides the effects similar to the first and the second embodiments.

Furthermore, the optical fiber cutting system 10 of this embodiment includes the operating unit 3 and the storage unit 4 which are disposed of the above-described external device 6C. Accordingly, compared with the optical fiber cutting system 1 of the first embodiment, the optical fiber cutting device 2C can be compact and the cost can be reduced.

Figure 11:
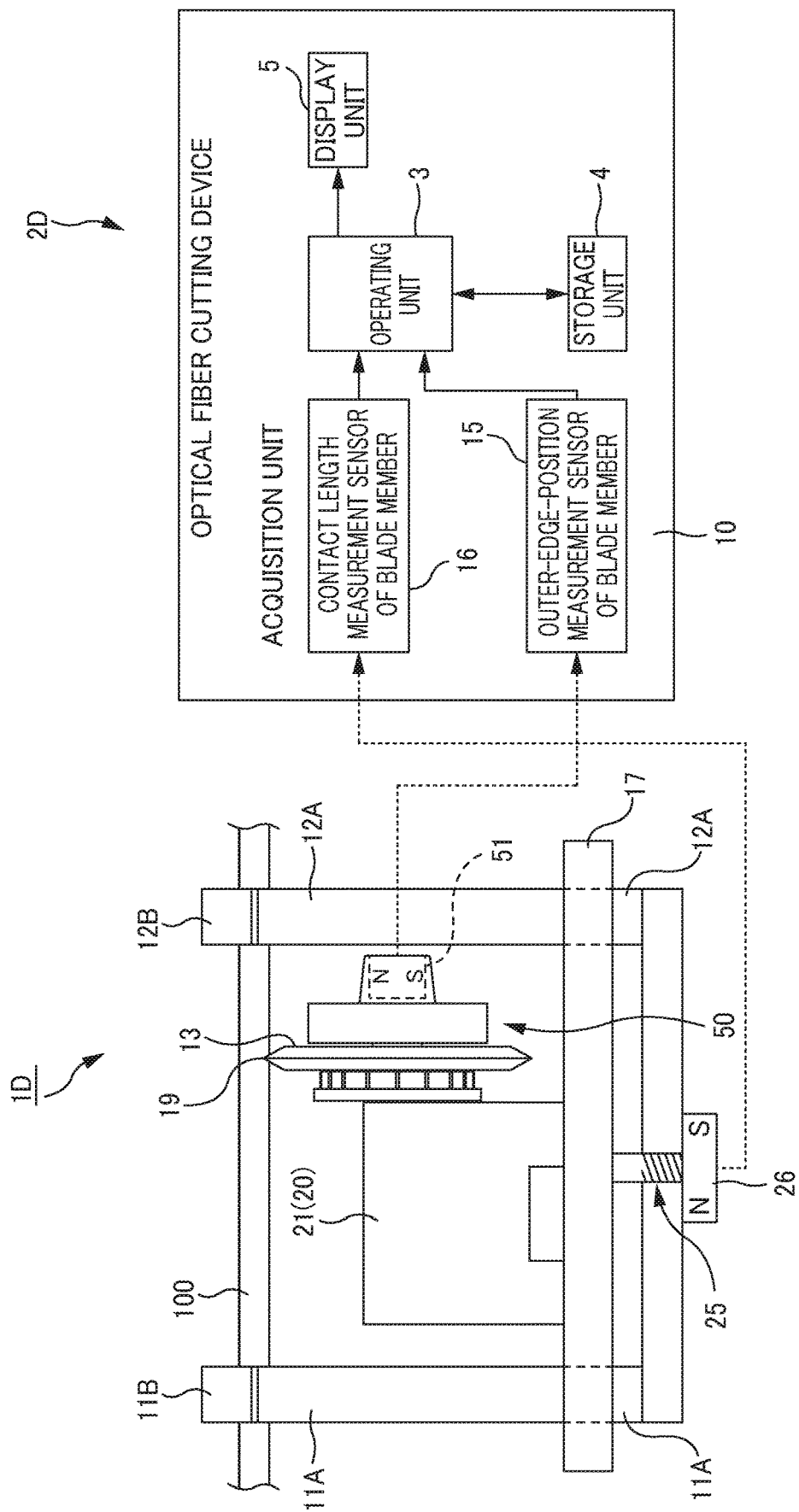
FIG. 11 is a block diagram illustrating an optical fiber cutting system of a fifth embodiment.

The following describes the fifth embodiment mainly in differences from the first embodiment with reference to FIG. 11. Like reference numerals designate corresponding or identical elements throughout the configurations in common between the first embodiment and the fifth embodiment, and therefore such elements will not be further elaborated here.

As illustrated in FIG. 11, an optical fiber cutting system 1D of this embodiment includes an optical fiber cutting device 2D, the outer-edge-position measurement sensor 15, the contact length measurement sensor 16, the operating unit 3, the storage unit 4, and the display unit 5 similar to the first embodiment. The functions of the operating unit 3, the storage unit 4, and the display unit 5 are similar to the first embodiment.

In the optical fiber cutting device 2D of this embodiment, adjusting the height position of the optical fiber 100 with respect to the blade member 13 adjusts the relative position in the height direction between the optical fiber 100 and the blade member 13. Thus, the contact length of the blade member 13 is adjusted. An adjusting screw 25 is mounted to the base 17. The adjusting screw 25 is a rotating member that adjusts the height positions of the clamps 11 and 12 (grip portions to grip the optical fiber 100). The clamps 11 and 12 protrude upward the base 17, and rotating the adjusting screw 25 changes the height positions of the clamps 11 and 12, to adjust the height position of the optical fiber 100. A magnet 26 is disposed of the head of the adjusting screw 25. Here, the head of the adjusting screw 25 is formed into a disk shape. The head of the adjusting screw 25 is magnetized so that a magnetic line is along a direction of a diameter of the disk-shaped head (a direction perpendicular to the rotation axis of the adjusting screw 25). Note that, instead of magnetizing the head of the adjusting screw 25, the fixed component fixed to the adjusting screw 25 (the component rotating together with the adjusting screw 25) may be magnetized so that the magnetic line is in a direction perpendicular to the rotation axis of the adjusting screw 25. Alternatively, both the adjusting screw 25 and the fixed component fixed to the adjusting screw 25 may be magnetized so that the magnetic line is in a direction perpendicular to the rotation axis of the adjusting screw 25.

The contact length measurement sensor 16 serving as the magnetic sensor detects the magnetic line generated by the magnet 26 at the head of the adjusting screw 25, and the sensor 16 outputs the signal corresponding to the rotation position of the magnet 26. Accordingly, even if cutting dust and coating dust of the optical fiber 100 enter between the contact length measurement sensor 16 and the adjusting screw 25, the contact length measurement sensor 16 can output the signal corresponding to the rotation position of the adjusting screw 23 without being affected by the cutting dust and the coating dust of the optical fiber 100. Even if the ambient light enters from the outside, the contact length measurement sensor 16 can output the signal corresponding to the rotation position of the adjusting screw 25 without being affected by the ambient light. Therefore, the contact length measurement sensor 16 can accurately measure the height position of the optical fiber 100 with respect to the blade member 13 (the relative position in the height direction between the optical fiber 100 and the blade member 13 (or the outer peripheral edge portion 19)).

In this embodiment, the relative position in the height direction between the blade member 13 and the optical fiber 100 is adjusted not by adjusting the position of the blade member 13 in the height direction like the above-described embodiment, but by adjusting the positions in the height direction of the clamps 11 and 12, which grip the optical fiber 100. Since, in the optical fiber cutting device 2D of this embodiment, it is not necessary to adjust the height position of the blade member 13, the blade base 20 does not include the oscillating portion 22. And, the blade member 13 is disposed of the base portion 21 in the middle in the direction in which the base portion 21 is elongated. Similar to the first embodiment, the rotation unit 50 holds the blade member 13 and the magnet 51 in a manner to be capable of rotating with respect to the blade base 20.

The optical fiber cutting system 1D of this embodiment provides the effects similar to the first embodiment. Furthermore, since, in the optical fiber cutting system 1D of this embodiment, it is not necessary to include the oscillating portion 22 in the blade base 20, the configuration of the blade base 20 to move the blade member 13 can be compact and simplified compared with the optical fiber cutting system 1 of the first embodiment.

[Others]

While the details of various embodiments of the present invention are described above, the present invention is not limited to the above-described embodiments and various modifications are possible within a range not departing from the gist of the present invention.

For example, in the optical fiber cutting systems 1A and 1C of the second and the fourth embodiments which include the operating units 3 in the external devices, the storage units 4 may be included in the optical fiber cutting devices 2A and 2C. That is, the maintenance information calculated by the operating units 3 in the external devices 6A and 6C may be transmitted to the optical fiber cutting devices 2A and 2C, and may be stored in the storage units 4 in the optical fiber cutting devices 2A and 2C.

In the optical fiber cutting systems 1A to 1C of the second to the fourth embodiments which include the optical fiber cutting devices 2A to 2C and the external devices 6A to 6C, both the optical fiber cutting devices 2A to 2C and the external devices 6A to 6C may include the operating units 3, the storage units 4, and the display units 5, for example.

The information on "the correct order of use of the blade member" preliminary stored in the storage unit 4 in the optical fiber cutting system is not limited to the ones described in the embodiments, but it may be constructed in any order.

With the optical fiber cutting system, if the movement mistake of the blade member 13 by an operator occurs by changing the position of the blade member 13, a method for warning the operator is not limited to displaying on the display unit 5. Making a sound out of a speaker or the like may also be employed.

In the optical fiber cutting system, it is also acceptable to count the number of scratches on the optical fiber 100 which are made by the identical height position of the blade member 13 and the outer peripheral edge portion 19. In this case, the degree of exhaustion and the remaining product life of the blade member 13 can be calculated by the operating unit 3 based on the acquired position information and the number of scratches on the optical fiber 100. Consequently, compared with the above-described embodiments, the information of the degree of exhaustion and the remaining product life of the blade member 13 can be informed to the operator in further detail.

For example, the optical fiber cutting device may include an image analyzer to analyze a state of an end surface of the optical fiber after the cutting. In this case, for example, the following manner is acceptable: based on the result of the analysis of the end surface acquired by the image analyzer, it is determined whether or not the cutting performance of the predetermined outer peripheral edge portion 19 of the blade member 13 deteriorates; and if determined that the cutting performance deteriorates, the display unit 5 displays an instruction to change the position of the blade member 13 with respect to the optical fiber 100. The analysis of the optical fiber end surface acquired by the image analyzer also makes it possible for the operating unit 3 or a similar unit to calculate, based on the position information of the blade member 13, an appropriate timing of changing the position of the blade member 13 with respect to the optical fiber 100.

The optical fiber cutting device is not limited to the optical fiber cutting device where the operator or a similar person manually changes the position of the blade member 13 with respect to the optical fiber 100. For example, the optical fiber cutting device that causes a motor etc. to automatically change the position of the blade member 13 with respect to the optical fiber 100 may also be employed.

REFERENCE SIGNS LIST 1, 1A, 1B, 1C optical fiber cutting system
2, 2A, 2B, 2C optical fiber cutting device
3 operating unit
4 storage unit
5 display unit 6A, 6B, 6C external device
10 acquisition unit
11, 12 clamp
13 blade member
13A fitting hole
14 pressing member
15 outer-edge-position measurement sensor (magnetic sensor)
16 contact length measurement sensor (magnetic sensor)
17 base
18 elastic pad
19 outer peripheral edge portion
20 blade base
21 base portion
22 oscillating portion
23 adjusting screw
24 magnet
25 adjusting screw
26 magnet
31A transmitter
50 rotation unit
51 magnet
52 pressing member (one example of fixed component)
521 flange part
521A projected portion
522 protruding part
53 rotation shaft
54 ratchet mechanism
541 ratchet disk
541A projected portion
542 ratchet pawl
60 sensor-side unit
61 oscillating member
62 sensor rotation shaft
100 optical fiber Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

The invention claimed is:

1. An optical fiber cutting system comprising:
a pair of clamps disposed at an interval in a longitudinal direction of an optical fiber and that grips the optical fiber;
a disk-shaped blade member including an outer peripheral edge portion, wherein the blade member:
scratches the optical fiber by moving between the pair of clamps and by bringing the outer peripheral edge portion into contact with a surface of the optical fiber, and
changes a position of the outer peripheral edge portion where the outer peripheral edge portion is in contact with the optical fiber;
a pressing member that breaks the optical fiber by pressing and bending a scratched portion on the optical fiber; and
a sensor that acquires position information of the outer peripheral edge portion where the outer peripheral edge portion is in contact with the optical fiber,
wherein the sensor acquires the position information of the outer peripheral edge portion by detecting a direction of a magnetic line that corresponds to the position of the outer peripheral edge portion.

2. The optical fiber cutting system according to claim 1, wherein the position information includes a rotation position of the blade member.

3. The optical fiber cutting system according to claim 2, wherein:
the blade member is magnetized,
a magnetic line is generated along a direction of a diameter of a plane of the blade member when the blade member is magnetized, and
the sensor acquires the rotation position of the blade member as the position information by detecting a direction of the magnetic line.

4. The optical fiber cutting system according to claim 3, wherein
the blade member is magnetized through an application of a magnetic field, and
the magnetized blade member generates the magnetic line.

5. The optical fiber cutting system according to claim 3, wherein the blade member includes a magnet that generates the magnetic line.

6. The optical fiber cutting system according to claim 5, wherein the magnet is mounted to a fixed component fixed to the blade member.

7. The optical fiber cutting system according to claim 1, wherein the position information includes a relative position of the blade member in a height direction between the blade member and the optical fiber.

8. The optical fiber cutting system according to claim 7, wherein
the optical fiber cutting system further comprises an adjustment mechanism that adjusts, according to a rotation position of a screw, the relative position of the blade member in the height direction,
at least one of the screw and a fixed component fixed to the screw is magnetized so that a magnetic line is in a direction perpendicular to a rotation axis of the screw, and
the sensor acquires, as the position information, the relative position of the blade member in the height direction by detecting a direction of the magnetic line.

9. The optical fiber cutting system according to claim 8, wherein
at least one of the screw and the fixed component is magnetized through an application of a magnetic field, and
the at least one of the screw and the fixed component generates the magnetic line.

10. The optical fiber cutting system according to claim 8, wherein
a magnet is mounted to at least one of the screw and the fixed component fixed to the screw, and
the magnet generates the magnetic line.

11. The optical fiber cutting system according to claim 8, wherein
the relative position of the blade member in the height direction between the blade member and the optical fiber is adjusted by adjusting of positions of the clamps in the height direction, and
the clamps grip the optical fiber.

\* \* \* \* \*